United States Patent
Pukish et al.

(10) Patent No.: US 10,091,077 B1
(45) Date of Patent: Oct. 2, 2018

(54) SYSTEMS AND METHODS FOR DETECTING TRANSACTIONAL MESSAGE SEQUENCES THAT ARE OBSCURED IN MULTICAST COMMUNICATIONS

(71) Applicant: Symantec Corporation, Mountain View, CA (US)

(72) Inventors: Michael Pukish, Santa Clara, CA (US); Minjie Qiu, San Jose, CA (US); Shankar Somasundaram, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 162 days.

(21) Appl. No.: 15/194,337

(22) Filed: Jun. 27, 2016

(51) Int. Cl.
*G06F 15/173* (2006.01)
*H04L 12/26* (2006.01)
(Continued)

(52) U.S. Cl.
CPC ............ *H04L 43/045* (2013.01); *H04L 12/18* (2013.01); *H04L 43/08* (2013.01);
(Continued)

(58) Field of Classification Search
CPC .......................... H04L 43/045; H04L 63/1416
See application file for complete search history.

(56) References Cited

U.S. PATENT DOCUMENTS 7,015,811 B2   3/2006   Decker et al.
7,475,124 B2   1/2009   Jiang et al.
(Continued)

FOREIGN PATENT DOCUMENTS

| CN | 102571469 A | 7/2012 |
|---|---|---|
| CN | 102893289 A | 1/2013 |
| EP | 2515250 A1 | 10/2012 |

OTHER PUBLICATIONS

Zhipeng Zhao et al.; Systems and Methods for Identifying Message Payload Bit Fields in Electronic Communications; U.S. Appl. No. 15/359,076, filed Nov. 22, 2016.
(Continued)

*Primary Examiner* — Hua Fan
(74) *Attorney, Agent, or Firm* — FisherBroyles, LLP

(57) ABSTRACT

The disclosed computer-implemented method for detecting transactional message sequences that are obscured in multicast communications may include (i) collecting a sequence of messages that were distributed on a communication channel and that include an obscured cyclic sequence of request-response messages that are interleaved in the sequence of messages, (ii) constructing a sequence graph from the sequence of messages by (a) adding, for each unique message identifier in the sequence of messages, a node to represent the unique message identifier and (b) adding, for each unique sequence transition in the sequence of messages from an immediately-preceding message to an immediately-succeeding message, an edge to connect the nodes that represent the identifiers of the unique sequence transition's immediately-preceding and immediately-succeeding messages, (iii) traversing the sequence graph to discover the obscured cyclic sequence of request-response messages, and (iv) performing a security action. Various other methods, systems, and computer-readable media are also disclosed.

20 Claims, 17 Drawing Sheets

(51) Int. Cl.
  *H04L 12/18* (2006.01)
  *H04L 29/08* (2006.01)
  *H04L 29/06* (2006.01)
(52) U.S. Cl.
  CPC ...... *H04L 63/1416* (2013.01); *H04L 63/1425* (2013.01); *H04L 63/1441* (2013.01); *H04L 67/12* (2013.01)

(56) References Cited

U.S. PATENT DOCUMENTS

| | | |
|---|---|---|
| 7,673,074 B1 | 3/2010 | Sebastian et al. |
| 7,861,300 B2 | 12/2010 | Arnold et al. |
| 8,104,090 B1 | 1/2012 | Pavlyushchik |
| 8,126,891 B2 | 2/2012 | Laxman et al. |
| 8,341,745 B1 | 12/2012 | Chau et al. |
| 8,544,087 B1 | 9/2013 | Eskin et al. |
| 8,566,938 B1 | 10/2013 | Prakash et al. |
| 8,925,037 B2 | 12/2014 | Marino et al. |
| 8,973,133 B1 | 3/2015 | Cooley |
| 9,053,516 B2 | 6/2015 | Stempora |
| 9,088,560 B1 | 7/2015 | Newstadt et al. |
| 9,141,790 B2 | 9/2015 | Roundy et al. |
| 9,148,441 B1 | 9/2015 | Tamersoy et al. |
| 9,166,997 B1 | 10/2015 | Guo et al. |
| 9,256,739 B1 | 2/2016 | Roundy et al. |
| 9,332,030 B1 | 5/2016 | Pereira |
| 9,384,066 B1 | 7/2016 | Leita et al. |
| 9,473,380 B1 | 10/2016 | Bermudez et al. |
| 9,529,990 B2 | 12/2016 | Newstadt et al. |
| 9,582,669 B1 | 2/2017 | Shen et al. |
| 2002/0124089 A1 | 9/2002 | Aiken et al. |
| 2004/0044771 A1 | 3/2004 | Allred et al. |
| 2004/0059822 A1 | 3/2004 | Jiang et al. |
| 2005/0030969 A1 | 2/2005 | Fredriksson |
| 2005/0138413 A1 | 6/2005 | Lippmann et al. |
| 2006/0095573 A1 | 5/2006 | Carle et al. |
| 2006/0236374 A1 | 10/2006 | Hartman |
| 2008/0088408 A1 | 4/2008 | Backman |
| 2008/0134327 A1 | 6/2008 | Bharrat et al. |
| 2009/0144308 A1 | 6/2009 | Huie et al. |
| 2009/0157365 A1 | 6/2009 | Higuchi et al. |
| 2010/0186088 A1 | 7/2010 | Banerjee et al. |
| 2010/0192226 A1 | 7/2010 | Noel et al. |
| 2010/0235879 A1 | 9/2010 | Burnside et al. |
| 2011/0019774 A1 | 1/2011 | Furuta |
| 2011/0047620 A1 | 2/2011 | Mahaffey et al. |
| 2011/0083180 A1 | 4/2011 | Mashevsky et al. |
| 2011/0302656 A1 | 12/2011 | El-Moussa |
| 2011/0314546 A1 | 12/2011 | Aziz et al. |
| 2011/0320617 A1 | 12/2011 | Annamalaisami et al. |
| 2012/0144468 A1 | 6/2012 | Pratt et al. |
| 2012/0233683 A1 | 9/2012 | Ibrahim et al. |
| 2013/0031037 A1 | 1/2013 | Brandt et al. |
| 2013/0042294 A1 | 2/2013 | Colvin et al. |
| 2013/0212659 A1 | 8/2013 | Maher et al. |
| 2013/0333032 A1 | 12/2013 | Delatorre et al. |
| 2014/0019636 A1* | 1/2014 | Abela ............... H04L 29/08 709/231 |
| 2014/0226664 A1 | 8/2014 | Chen et al. |
| 2014/0258379 A1 | 9/2014 | L'Heureux et al. |
| 2014/0330977 A1 | 11/2014 | van Bemmel |
| 2014/0365646 A1 | 12/2014 | Xiong |
| 2015/0113638 A1 | 4/2015 | Valasek et al. |
| 2015/0150124 A1 | 5/2015 | Zhang et al. |
| 2015/0261655 A1 | 9/2015 | Versteeg et al. |
| 2015/0281047 A1 | 10/2015 | Raju et al. |
| 2016/0261482 A1 | 9/2016 | Mixer et al. |
| 2017/0118234 A1 | 4/2017 | Arora et al. |

OTHER PUBLICATIONS

Mahoney, Network traffic anomaly detection based on packet bytes, Proceedings of the 2003 ACM symposium on Applied computing, pp. 346-350, Mar. 9, 2003.

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000, 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Pukish et al., U.S. Appl. No. 15/194,337, filed Jun. 27, 2016.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks. pdf, Big Data Applications and Principles, First International Workshop, BIGDAP 2014, Madrid, Spain, Sep. 11, 2014.

Vishal Bajpai et al.; System and Method for Identifying an Invalid Packet on a Controller Area Network (CAN) Bus; U.S. Appl. No. 15/056,864, filed Feb. 29, 2016.

Muter et al., A structured approach to anomaly detection for in-vehicle networks, 2010 Sixth International Conference on Information Assurance and Security (IAS), pp. 92-98, Aug. 23, 2010.

Balthrop et al., Revisiting LISYS: Parameters and Normal Behavior, Proceedings of the 2002 Congress on Evolutionary Computation, pp. 1045-1050, May 12, 2002.

Clifton et al., Developing custom intrusion detection filters using data mining, MILCOM 2000, 21st Century Military Communications Conference Proceedings, vol. 1, pp. 440-443, Oct. 22, 2000.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, On or before Aug. 29, 2014.

(56) References Cited

OTHER PUBLICATIONS

CAN protocol specification; http://www.can-cia.org/index.php?id=164, as accessed Aug. 29, 2014, Oct. 17, 2010.
Controller Area Network (CAN) Overview; http://www.ni.com/white-paper/2732/en/, as accessed Aug. 29, 2014; National Instruments Corporation, Aug. 1, 2014.
Driver Feedback; https://play.google.com/store/apps/details?id=com.statefarm.driverfeedback, as accessed Aug. 29, 2014; State Farm Insurance, Android Apps on Google Play, Jun. 2, 2013.
Electronic control unit; https://en.wikipedia.org/wiki/Electronic_control_unit, as accessed Feb. 9, 2015; Wikipedia, Jul. 28, 2004.
EMI/ESD Protection Solutions for the CAN Bus; http://www.onsemi.com/pub_link/Collateral/AND8169-D.PDF, as accessed Aug. 29, 2014; Publication Order No. AND8169/D, On Semiconductor, Semiconductor Components Industries, LLC, Jun. 2014—Rev. 2.
Emulation; https://en.wikipedia.org/wiki/Emulation, as accessed Feb. 9, 2015; Wikipedia,Dec. 3, 2003.
FlexRay Automotive Communication Bus Overview; http://www.ni.com/white-paper/3352/en/, as accessed Aug. 29, 2014; National Instruments Corporation, Aug. 21, 2009.
Hardware emulation; https://en.wikipedia.org/wiki/Hardware_emulation, as accessed Feb. 9, 2015; Wikipedia, Sep. 13, 2006.
Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.
Regev; Automotive Ethernet Security Testing; http://standards.ieee.org/events/automotive/2014/20_Automotive_Ethernet_Security_Testing.pdf, as accessed Feb. 9, 2015, 2014.
Snapshot; https://www.progressive.com/auto/snapshot/, as accessed Aug. 29, 2014; Progressive Casualty Insurance Company, Mar. 8, 2013.
Vehicle bus; https://en.wikipedia.org/wiki/Vehicle_bus, as accessed Feb. 9, 2015; Wikipedia, May 12, 2005.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.
Wolf; Security in Automotive Bus Systems; http://www.weika.eu/papers/WolfEtAl_SecureBus.pdf, as accessed Aug. 29, 2014, 2004.
Adam Glick, et al.; Systems and Methods for User-Directed Malware Remediation; U.S. Appl. No. 13/419,360, filed Mar. 13, 2012.
Carey Nachenberg, et al.; Systems and Methods for Neutralizing File-Format-Specific Exploits Included Within Files Contained Within Electronic Communications; U.S. Appl. No. 13/418,332, filed Mar. 12, 2012.
Leylya Yumer, et al.; Systems and Methods for Analyzing Zero-Day Attacks; U.S. Appl. No. 13/901,977, filed May 24, 2013.
Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.
Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.
William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.

Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.
Triumfant, Inc.; Detecting the Advanced Persistent Threat; Nov. 30, 2010; www.triumfant.com/advanced_persistent_threat.asp, as accessed Aug. 8, 2013.
EMC Corporation; Advanced Persistent Threat (APT) and Rootkit Detection; 2012; http://www.siliciumsecurity.com/advanced-persistent-threats-and-rootkits-detection/, as accessed Aug. 8, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

(56) References Cited

OTHER PUBLICATIONS

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworld.com/article/2171967/access-control/attackers-used-known-exploit-to-steal-customer-log-in-credentials--vbulletin-maker-sa.html, IDG News Service, Network World, (Nov. 18, 2013).

"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011, PowerPoint Slides, Jul 22, 2012.
Asi, et al., Black Box System Design, Dec. 14, 2010.
Ignacio Bermudez Corrales, et al; Systems and Methods for Identifying Compromised Devices Within Industrial Control Systems; U.S. Appl. No. 14/952,344, filed Nov. 25, 2015.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: on the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; PHAD: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.

(56) References Cited

OTHER PUBLICATIONS

Perdisci; McPAD : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.

Snort (software); https://en.wikipedia.org/wiki/Snort_(software), as accessed Sep. 29, 2015; Wikipedia.

The Bro Network Security Monitor; https://www.bro.org/, as accessed Sep. 29, 2015.

Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.

Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.

Walter Bogorad; Systems and Methods for Detecting Anomalies That Are Potentially Indicative of Malicious Attacks; U.S. Appl. No. 15/059,326, filed Mar. 3, 2016.

Aggarwal; Outlier Analysis; http://www.springer.com/us/book/9781461463955, as accessed Feb. 1, 2016, (2013).

Dunning; Practical Machine Learning: A New Look At Anomaly Detection; https://www.mapr.com/practical-machine-learning-new-look-anomaly-detection, as accessed Feb. 1, 2016, (Jul. 21, 2014).

Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).

Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).

Yolacan; Learning From Sequential Data for Anomaly Detection; https://repository.library.northeastern.edu/downloads/neu:349795, as accessed Feb. 1, 2016; Dissertation, (Oct. 2014).

Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.

K. Nyalkalkar et al., "A comparative study of two network-based anomaly detection methods," in 2011 Proceedings IEEE INFOCOM, 2011.

S. Sinha et al., "WIND: Workload-Aware INtrusion Detection," in Recent Advances in Intrusion Detection, D. Zamboni and C. Kruegel, Eds. Springer Berlin Heidelberg, 2006.

L. Huang et al., "In-network PCA and anomaly detection," in In NIPS, 2006.

N. Goldenberg et al., "Accurate modeling of Modbus/TCP for intrusion detection in SCADA systems," Int. J. Crit. Infrastruct. Prot., vol. 6, No. 2, Jun. 2013.

M.-K. Yoon et al., "Communication Pattern Monitoring: Improving the Utility of Anomaly Detection for Industrial Control Systems," in Internet Society, San Diego, CA, USA, 2014.

N. Borisov et al., "Generic Application-Level Protocol Analyzer and its Language," Microsoft Research, MSR-TR-2005-133, Feb. 2005.

"Transmission Control Protocol", http://en.wikipedia.org/wiki/Transmission_Control_Protocol, as accessed Jul. 10, 2014, Wikipedia, (Dec. 18, 2003).

A. Greenberg, "Hackers Remotely Kill a Jeep on the Highway—With Me in It," WIRED, Jul. 21, 2015. [Online]. Available: http://www.wired.com/2015/07/hackers-remotely-kill-jeep-highway/. [Accessed: Mar. 30, 2016].

Bajpai, et al; Systems and Methods for Detecting Suspicious Microcontroller Messages; U.S. Appl. No. 15/143,284, filed Apr. 29, 2016.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France.

Ben Othmane; Towards Extended Safety in Connected Vehicles; Proceedings of the 16th International IEEE Annual Conference on Intelligent Transportation Systems (ITSC 2013), The Hague, The Netherlands.

BournsA® Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014.

CAN protocol specification; http://www.can-cia.org/index.php?id=164, as accessed Aug. 29, 2014.

Controller Area Network (CAN) Overview; http://www.ni.com/white-paper/2732/en/, as accessed Aug. 29, 2014; National Instruments Corporation.

Driver Feedback; https://play.google.com/store/apps/details?id=com.statefarm.driverfeedback, as accessed Aug. 29, 2014; State Farm Insurance, Android Apps on Google Play.

Electronic control unit; https://en.wikipedia.org/wiki/Electronic_control_unit, as accessed Feb. 9, 2015; Wikipedia.

EMI/ESD Protection Solutions for the CAN Bus; http://www.onsemi.com/pub_link/Collateral/AND8169-D.PDF, as accessed Aug. 29, 2014; Publication Order No. AND8169/D, On Semiconductor, Semiconductor Components Industries, LLC.

Emulation; https://en.wikipedia.org/wiki/Emulation, as accessed Feb. 9, 2015; Wikipedia.

FlexRay Automotive Communication Bus Overview; http://www.ni.com/white-paper/3352/en/, as accessed Aug. 29, 2014; National Instruments Corporation.

Hardware emulation; https://en.wikipedia.org/wiki/Hardware_emulation, as accessed Feb. 9, 2015; Wikipedia.

Kleberger; Security Aspects of the In-Vehicle Network in the Connected Car; Intelligent Vehicles Symposium (IV), 2011 IEEE, Baden-Baden, Germany.

Koscher; Experimental Security Analysis of a Modern Automobile; http://www.autosec.org/pubs/cars-oakland2010.pdf, as accessed Feb. 9, 2015; 2010 IEEE Symposium on Security and Privacy.

Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation.

Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV.

Muter; A structured approach to anomaly detection for in-vehicle networks; 2010 Sixth International Conference on Information Assurance and Security (IAS), Atlanta, GA.

Muter; Entropy-based anomaly detection for in-vehicle networks; 2011 IEEE Intelligent Vehicles Symposium (IV), DOI: 10.1109/IVS.2011.5940552, Baden-Baden, Germany.

Nathan Evans, et al; Systems and Methods for Detecting Anomalous Messages in Automobile Networks; U.S. Appl. No. 14/525,792, filed Oct. 28, 2014.

Nathan Evans, et al; Systems and Methods for Evaluating Electronic Control Units Within Vehicle Emulations; U.S. Appl. No. 14/671,036, filed Mar. 27, 2015.

Regev; Automotive Ethernet Security Testing; http://standards.ieee.org/events/automotive/2014/20_Automotive_Ethernet_Security_Testing.pdf, as accessed Feb. 9, 2015.

Snapshot; https://www.progressive.com/auto/snapshot/, as accessed Aug. 29, 2014; Progressive Casualty Insurance Company.

Vehicle bus; https://en.wikipedia.org/wiki/Vehicle_bus, as accessed Feb. 9, 2015; Wikipedia.

Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News.

Wolf; Security in Automotive Bus Systems; http://www.weika.eu/papers/WolfEtAl_SecureBus.pdf, as accessed Aug. 29, 2014.

Yun Shen, et al; Systems and Methods for Detecting Discrepancies in Automobile-Network Data; U.S. Appl. No. 14/525,715, filed Oct. 28, 2014.

(56) References Cited

OTHER PUBLICATIONS

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014.

Steven Noel et al., "Correlating Intrusion Events and Building Attack Scenarios Through Attack Graph Distances", Computer Security Applications Conference, 2004. 20$^{th}$ Annual Tucson, AZ, USA Dec. 6-10, 2004, (Dec. 10, 2004), pp. 350-359.

Extending schedulability analysis of Controller Area Network (CAN) for mixed (periodic/sporadic) messages (http://ieeexplore.ieee.org/document/6059010/); Sep. 5, 2011.

A structured approach to anomaly detection for in-vehicle networks (http://ieeexplore.ieee.org/stamp/stamp.jsp?arnumber=5604050); Aug. 23, 2010.

Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.

Vishal Bajpai et al,; System and Method for Identifying an Invalid Packet on a Controller Area Network (CAN) Bus; U.S. Appl. No. 15/056,864, filed Feb. 29, 2016.

Vishal Bajpai et al.; Systems and Methods for Identifying Suspicious Controller Area Network Messages; U.S. Appl. No. 15/587,762, filed May 5, 2017.

\* cited by examiner

SYSTEMS AND METHODS FOR DETECTING TRANSACTIONAL MESSAGE SEQUENCES THAT ARE OBSCURED IN MULTICAST COMMUNICATIONS

BACKGROUND

Most modern automobiles operate via the correct functioning of various components (e.g., discrete electronic control units (ECUs), sensors, and/or actuators) that communicate over one or more in-vehicle automobile networks (e.g., Controller Area Networks (CANS) and FlexRay Networks). Traditional automobile networks have been multicast networks, and traditional automobile-network messages have generally not included source or destination addresses. Instead of using source or destination addresses, transmitting components have generally used unique identifiers to label the automobile-network messages that they broadcast and to provide meaning to the data that the messages contain. In a typical automobile, many diverse systems share and communicate over the same automobile network. As a result, conversations (e.g., request-response message transactions) among components of one system may appear on an automobile network randomly interleaved with conversations among components of other systems. As such, each component that is connected to a traditional automobile network will generally (1) receive each automobile-network message that is broadcast over the automobile network and (2) be required to decide whether to act upon or ignore the received messages based on the messages' identifiers.

Traditionally, automobile-network components have been designed to trust the automobile-network messages that they receive. However in recent years, researchers and malicious attackers have begun to find various ways to cause an automobile to perform unexpected and/or undesired actions by (1) connecting to the automobile's automobile networks (e.g., via a diagnostic port located under the dash of the automobile or a compromised automobile-network component that has wireless communication capabilities) and by broadcasting malicious automobile-network messages over the automobile network. For example, by broadcasting malicious automobile-network messages over an automobile's automobile network, an attacker may be able to cause the automobile to misreport its speed, apply its brakes, turn its steering wheel, or even shut down.

Anomaly detection is a traditional method for detecting malicious messages within a network. Traditional anomaly-detection systems will often use baselines of normal message sequences to detect when abnormal (e.g., malicious) message sequences are present on a network. Unfortunately, the task of determining baselines for normal message sequences in automobile networks has traditionally been difficult since automobile-network messages traditionally do not include source or destination addresses and request-response message transactions of components of one system are typically randomly interleaved with request-response message transactions of components of other systems. Moreover, the identifiers used to label automobile messages may be unique to some automobile networks. For example, some automobile-network identifiers may be assigned uniquely for each vehicle, for each model year, and/or for different variants of the same vehicle in the same model year. Furthermore, many automobile manufactures do not disclose their assignments of automobile-network identifiers. The instant disclosure, therefore, identifies and addresses a need for improved systems and methods for detecting transactional message sequences that are obscured in multicast communications.

SUMMARY

As will be described in greater detail below, the instant disclosure describes various systems and methods for detecting transactional message sequences that are obscured in multicast communications. In one example, a computer-implemented method for detecting transactional message sequences that are obscured in multicast communications may include (i) collecting a sequence of messages that were distributed on a communication channel (e.g., an automobile-network bus) and that include an obscured cyclic (or recurring) sequence of request-response messages, (ii) constructing a sequence graph from the sequence of messages, (iii) traversing the sequence graph to discover the obscured cyclic sequence of request-response messages, and (iv) performing a security action using a representation of the obscured cyclic sequence of request-response messages. In some examples, the obscured cyclic sequence of request-response messages may have been exchanged by at least two components and may be interleaved in the sequence of messages, and each message in the sequence of messages may include an identifier that indicates a meaning of the message.

In some embodiments, the step of constructing the sequence graph from the sequence of messages may include (i) adding, for each unique message identifier in the sequence of messages, a node to the sequence graph to represent the unique message identifier and (ii) adding, for each unique sequence transition in the sequence of messages from an immediately-preceding message to an immediately-succeeding message, an edge to the sequence graph to represent the unique sequence transition and to connect the node that represents the identifier of the unique sequence transition's immediately-preceding message to the node that represents the identifier of the unique sequence transition's immediately-succeeding message. In certain embodiments, the step of collecting the sequence of messages may include (i) logging the identifier of each message in the sequence of messages, (ii) logging an order in which each message in the sequence of messages was observed, (iii) and logging a time at which each message in the sequence of messages was observed (e.g., by logging relative time deltas between successive messages).

In some embodiments, the step of constructing the sequence graph from the sequence of messages may further include (i) creating, for each node in the sequence graph, a dictionary of sequence transitions and (ii) adding, for each sequence transition in the sequence of messages whose succeeding message's identifier is equal to the identifier that is represented by the node, an entry to the dictionary to represent the sequence transition. In some embodiments, the entry may include (i) a preceding-message identifier that is equal to the identifier of the sequence transition's preceding message, (ii) a transition order that is equal to the order of the sequence transition in the sequence of messages, and (iii) a time interval equal to the amount of time between observances of the sequence transition's preceding message and the sequence transition's succeeding message. In at least one embodiment, the edge that connects the nodes that represent the identifiers of the sequence transition's preceding and succeeding messages may be a directed edge that is incident from the node that represents the identifier of the sequence transition's preceding message and incident to the node that represents the identifier of the sequence transition's succeeding message.

In some embodiments, the step of traversing the sequence graph may include (i) visiting a node in the sequence graph and (ii) identifying a potential cyclic sequence transition by (a) identifying a group of entries in the node's dictionary whose preceding-message identifiers match and (b) determining that the potential cyclic sequence transition is likely a cyclic sequence transition in the obscured cyclic sequence of request-response messages by determining that a variation in the time intervals of the group's entries is less than a predetermined threshold.

In some embodiments, the step of traversing the sequence graph may further include promoting each entry in the node's dictionary along a directed edge incident from the node and incident to an adjacent node by (i) identifying the transition order of the entry, (ii) locating an adjacent entry in the adjacent node's dictionary whose transition order is one more than the transition order of the entry, and (iii) adding an additional entry to the adjacent node's dictionary that may include (a) a preceding-message identifier that is equal to the entry's preceding-message identifier, (b) a transition order that is equal to the transition order of the entry, and (c) a time interval that is equal to a sum of the time interval of the entry and the time interval of the adjacent entry.

In some embodiments, the step of traversing the sequence graph may further include (i) determining that the identifier that is represented by the node is an identifier of a proceeding message of another cyclic sequence transition in the obscured cyclic sequence of request-response messages and (ii) removing, from the dictionary of each node in the sequence graph, all entries whose preceding-message identifier matches the identifier that is represented by the node. In some embodiments, the step of traversing the sequence graph may further include (i) adding an additional directed edge to the sequence graph that is incident from the node that represents the entry's previous-message identifier and incident to the adjacent node, (ii) removing, from the sequence graph, each directed edge that is incident with the node, and/or (iii) removing the node from the sequence graph.

In some embodiments, the computer-implemented method may further include (i) creating a state machine to represent the obscured cyclic sequence of request-response messages, (ii) adding, to the state machine, a first state to represent the identifier of the potential cyclic sequence transition's preceding message, (iii) adding, to the state machine, a second state to represent the identifier of the potential cyclic sequence transition's succeeding message, and (iv) adding, to the state machine, a transition from the first state to the second state. In at least one embodiment, the step of adding the transition from the first state to the second state may include adding a guard condition to the transition that requires the transition to occur within a predetermined amount of time that is based on the time intervals of the group's entries, and the step of performing the security action may include (i) monitoring an additional sequence of messages on the communication channel, (ii) detecting an anomaly in the additional sequence of messages by determining that the additional sequence violates the guard condition, and (iii) performing the security action in response to detecting the anomaly.

In some embodiments, the step of performing the security action may include (i) monitoring an additional sequence of messages on the communication channel, detecting an anomaly in the additional sequence of messages by determining that the additional sequence violates the transition from the first state to the second state and (ii) performing the security action in response to detecting the anomaly. In certain embodiments, the step of detecting the anomaly may include determining that the anomaly indicates that the potential cyclic sequence transition is not a cyclic sequence transition in the obscured cyclic sequence of request-response messages, and the step of performing the security action may include updating the state machine.

In some embodiments, the step of detecting the anomaly may include determining that the anomaly indicates that a component has malfunctioned, and the security action may be performed to remediate the malfunctioning component. In other embodiments, the step of detecting the anomaly may include determining that the anomaly indicates a malicious attack on the communication channel, and the security action may be performed to remediate the malicious attack.

In one embodiment, a system for implementing the above-described method may include (i) a collecting module, stored in memory, that collects a sequence of messages that were distributed on a communication channel and that include an obscured cyclic sequence of request-response messages, (ii) a constructing module, stored in memory, that constructs a sequence graph from the sequence of messages, (iii) a traversing module, stored in memory, that traverses the sequence graph to discover the obscured cyclic sequence of request-response messages, (iv) a security module, stored in memory, that performs a security action using a representation of the obscured cyclic sequence of request-response messages, and (v) at least one processor that executes the collecting module, the constructing module, the traversing module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect a sequence of messages that were distributed on a communication channel and that include an obscured cyclic sequence of request-response messages, (ii) construct a sequence graph from the sequence of messages, (iii) traverse the sequence graph to discover the obscured cyclic sequence of request-response messages, and (iv) perform a security action using a representation of the obscured cyclic sequence of request-response messages.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
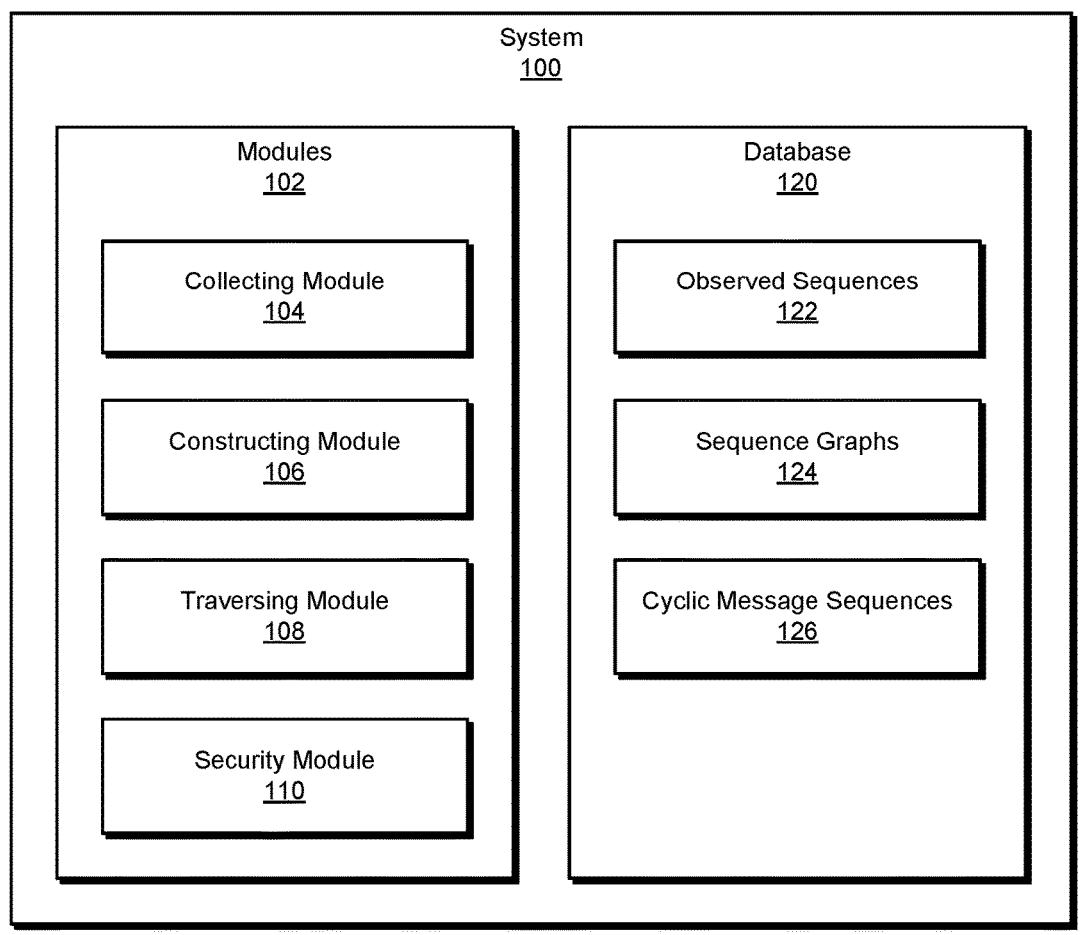
FIG. 1 is a block diagram of an exemplary system for detecting transactional message sequences that are obscured in multicast communications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting transactional message sequences that are obscured in multicast communications. As will be explained in greater detail below, by traversing a sequence graph that was created from a sequence of messages that were broadcast over a multicast communication channel (e.g., an automobile network), the systems and methods described herein may enable the discovery of cyclic (or recurring) sequences of request-response messages that are exchanged between a group of devices whose cyclic sequences of request-response messages are interleaved with and obscured by other messages that are also broadcast over the same multicast communication channel (e.g., cyclic sequences of request-response messages of other groups of devices). Furthermore, in some examples, by discovering cyclic sequences of request-response messages that were broadcast over the multicast communication channel, these systems and methods may enable the detection of anomalous messages within the multicast communication channel (e.g., messages of an attack on the communication channel or messages of malfunctioning devices). Embodiments of the instant disclosure may also provide various other advantages and features, as discussed in greater detail below.

Figure 2:
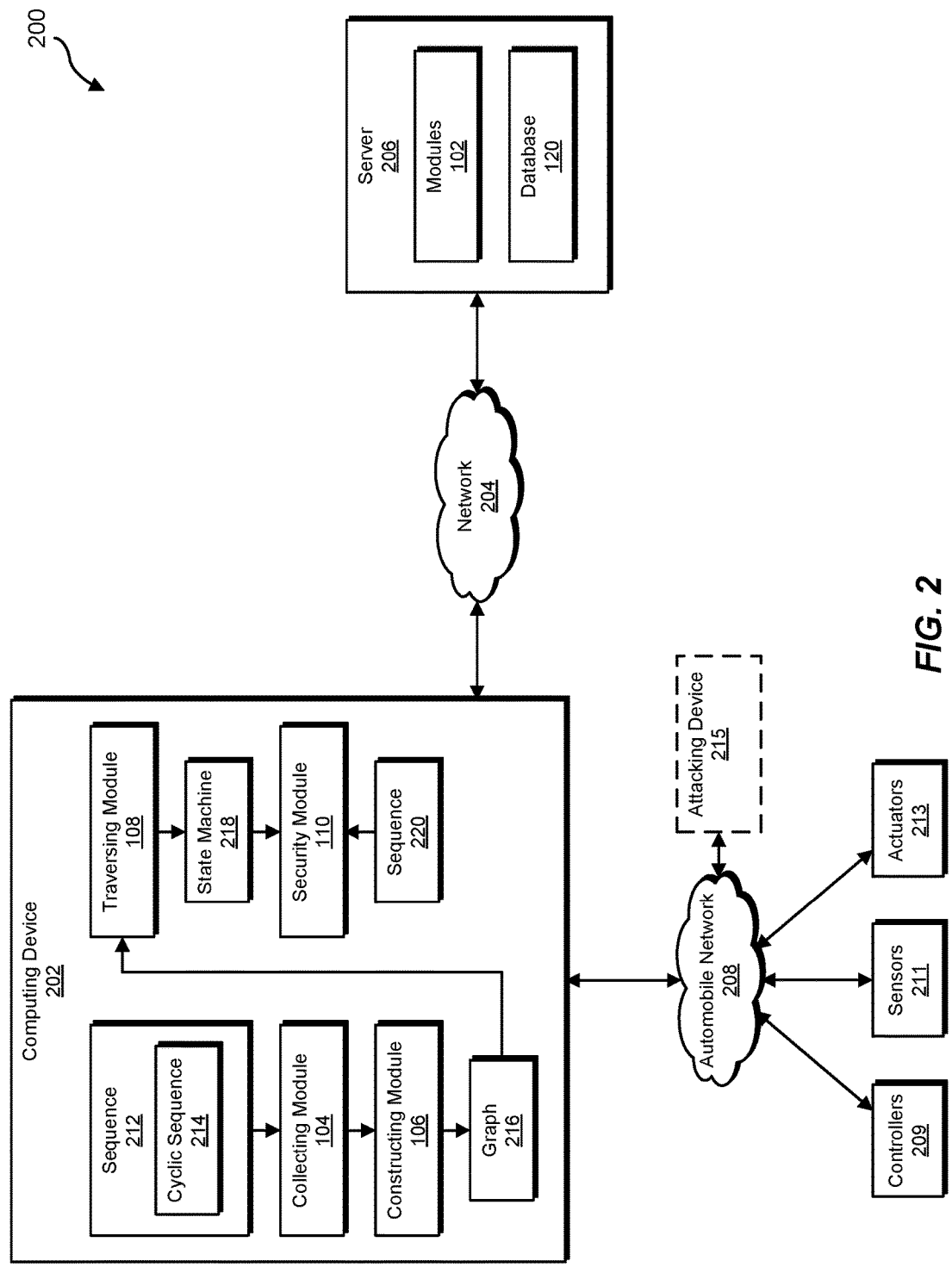
FIG. 2 is a block diagram of an additional exemplary system for detecting transactional message sequences that are obscured in multicast communications.
Figure 3:
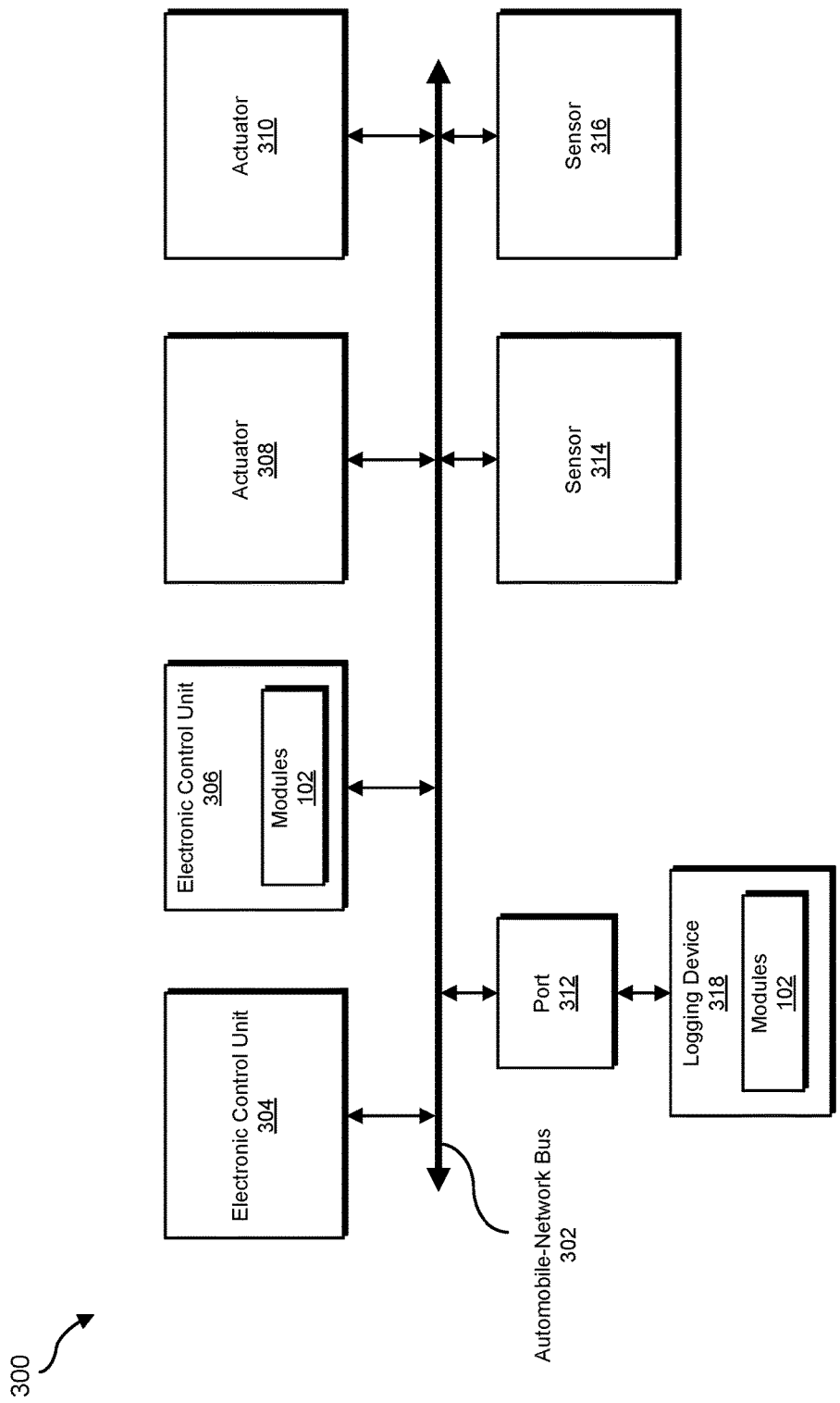
FIG. 3 is a block diagram of an exemplary automobile network.

The following will provide, with reference to FIGS. 1-3, detailed descriptions of exemplary systems for detecting transactional message sequences that are obscured in multicast communications. Detailed descriptions of corresponding computer-implemented methods will also be provided in connection with FIGS. 4-15. In addition, detailed descriptions of an exemplary computing system and network architecture capable of implementing one or more of the embodiments described herein will be provided in connection with FIGS. 16 and 17, respectively.

FIG. 1 is a block diagram of an exemplary system 100 for detecting transactional message sequences that are obscured in multicast communications. As illustrated in this figure, exemplary system 100 may include one or more modules 102 for performing one or more tasks. For example, and as will be explained in greater detail below, exemplary system 100 may include a collecting module 104 that collects a sequence of messages that were distributed on a communication channel and that include an obscured cyclic sequence of request-response messages. Exemplary system 100 may also include a constructing module 106 that constructs a sequence graph from the sequence of messages.

In addition, and as will be described in greater detail below, exemplary system 100 may include a traversing module 108 that traverses the sequence graph to discover the obscured cyclic sequence of request-response messages. Exemplary system 100 may also include a security module 110 that performs a security action using a representation of the obscured cyclic sequence of request-response messages. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1610 in FIG. 16, and/or portions of exemplary network architecture 1700 in FIG. 17. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include observed sequences 122 for storing information about one or more observed sequences, sequence graphs 124 for storing information about one or more sequence graphs, and cyclic message sequences 126 for storing information about one or more cyclic message sequences.

Database 120 may represent portions of a single database or computing device or a plurality of databases or computing devices. For example, database 120 may represent a portion of server 206 in FIG. 2, computing system 1610 in FIG. 16, and/or portions of exemplary network architecture 1700 in FIG. 17. Alternatively, database 120 in FIG. 1 may represent one or more physically separate devices capable of being accessed by a computing device, such as server 206 in FIG. 2, computing system 1610 in FIG. 16, and/or portions of exemplary network architecture 1700 in FIG. 17.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and a server 206 in communication via a network 204. System 200 may also include controllers 209, sensors 211, and actuators 213 that are connected to computing device 202 via an automobile network 208. In this example, computing device 202, controllers 209, sensors 211, and actuators 213 may be capable of broadcasting and/or receiving automobile-network messages (e.g., automobile-network message 500 in FIG. 5) via automobile network 208. In some examples, an attacker may use an attacking device 215 to connect to and perpetrate an attack on automobile network 208.

In one embodiment, one or more of modules 102 from FIG. 1 may, when executed by at least one processor of computing device 202 and/or server 206, enable computing device 202 and/or server 206 to detect transactional message sequences that are broadcast over automobile network 208. For example, and as will be described in greater detail below, one or more of modules 102 may cause computing device 202 and/or server 206 to (i) collect a sequence of messages 212 that were distributed on automobile network 208 and that include an obscured cyclic sequence of request-response messages 214, (ii) construct a sequence graph 216 from sequence 212, (iii) traverse sequence graph 216 to discover obscured cyclic sequence 214, (iv) create a state machine 218 that represents obscured cyclic sequence 214, and (v) perform a security action using state machine 218 (e.g., detect an anomaly in sequence 220).

In the preceding exemplary implementations of exemplary system 100 in FIG. 1, computing device 202 generally represents any type or form of computing device capable of reading computer-executable instructions and/or collecting automobile-network messages that are broadcast over an automobile network. Examples of computing device 202 include, without limitation, electronic control units (ECUs), automobile-network dongles, diagnostic devices, embedded systems, laptops, tablets, desktops, servers, cellular phones, Personal Digital Assistants (PDAs), wearable devices (e.g., smart watches, smart glasses, etc.), combinations of one or more of the same, exemplary computing system 1610 in FIG. 16, or any other suitable computing device. In at least one example, computing device 202 may represent a logging device that is intended to (1) be plugged directly into an automobile's network and/or (2) collect and/or monitor automobile-network messages for the purpose of detecting attacks on the automobile's network and/or malfunctioning components within the automobile's network. Additionally or alternatively, computing device 202 may represent an ECU that is intended to (1) be connected directly to an automobile's network and/or (2) collect and/or monitor automobile-network messages for the purpose of detecting attacks on the automobile's network and/or malfunctioning components within the automobile's network.

Automobile network 208 generally represents any medium or architecture capable of facilitating communication or data transfer amongst the components (e.g., controllers, sensors, and/or actuators) of an automobile. Examples of automobile network 208 include, without limitation, Controller Area Networks (CANS), FlexRay Networks, Local Interconnect Networks (LINs), in-vehicle buses, and/or exemplary automobile network 300 in FIG. 3. Automobile network 208 may facilitate communication or data transfer using wireless or wired connections. In some examples, automobile networks 208 may represent a broadcast and/or serial network.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Wi-Fi network or communication channel, a Bluetooth network or communication channel, a Near Field Communication (NFC) network or communication channel, or the like. Network 204 may facilitate communication or data transfer using wireless or wired connections. In one embodiment, network 204 may facilitate communication between computing device 202 and/or server 206.

Attacking device 215 generally represents any type or form of computing device with which an attacker may connect to or perpetrate an attack on automobile network 208 by broadcasting malicious automobile-network messages to automobile network 208. Examples of attacking device 215 include, without limitation, compromised electronic control units (ECUs), automobile-network dongles, and/or any other computing device.

FIG. 3 is a block diagram of an exemplary automobile network 300 of an automobile. As shown in FIG. 3, exemplary automobile network 300 may include ECUs 304 and 306, actuators 308 and 310, and sensors 314 and 316 connected via a common automobile-network bus 302. ECUs 304 and 306 generally represent any computing device or embedded system that controls or monitors a system or subsystem of an automobile. Examples of ECUs 304 and 306 include, without limitation, engine control units, brake control units, transmission control units, power-steering control units, and power-lock control units.

Actuators 308 and 310 generally represent any mechanical device that actuates a component of an automobile (e.g., throttle actuators, brake actuators, and power-steering actuators), and sensors 314 and 316 generally represent any sensor that measures attributes of an automobile (e.g., speed sensors, accelerometers, throttle position sensors, pedal position sensors, and steering-wheel position sensors, etc.). Automobile-network bus 302 generally represents any in-vehicle bus that interconnects the components of an automobile and that allows the components to exchange data. Examples of automobile-network bus 302 include, without limitation, CAN buses and LIN buses.

As shown in FIG. 3, exemplary automobile network 300 may also include a port 312 through which various devices (e.g., diagnostic, monitoring, or logging devices such as logging device 318) may connect to automobile-network bus 302. Port 312 generally represents an automobile's diagnostic port (such as, e.g., an On-Board Diagnostic (OBD) II port).

Figure 4:
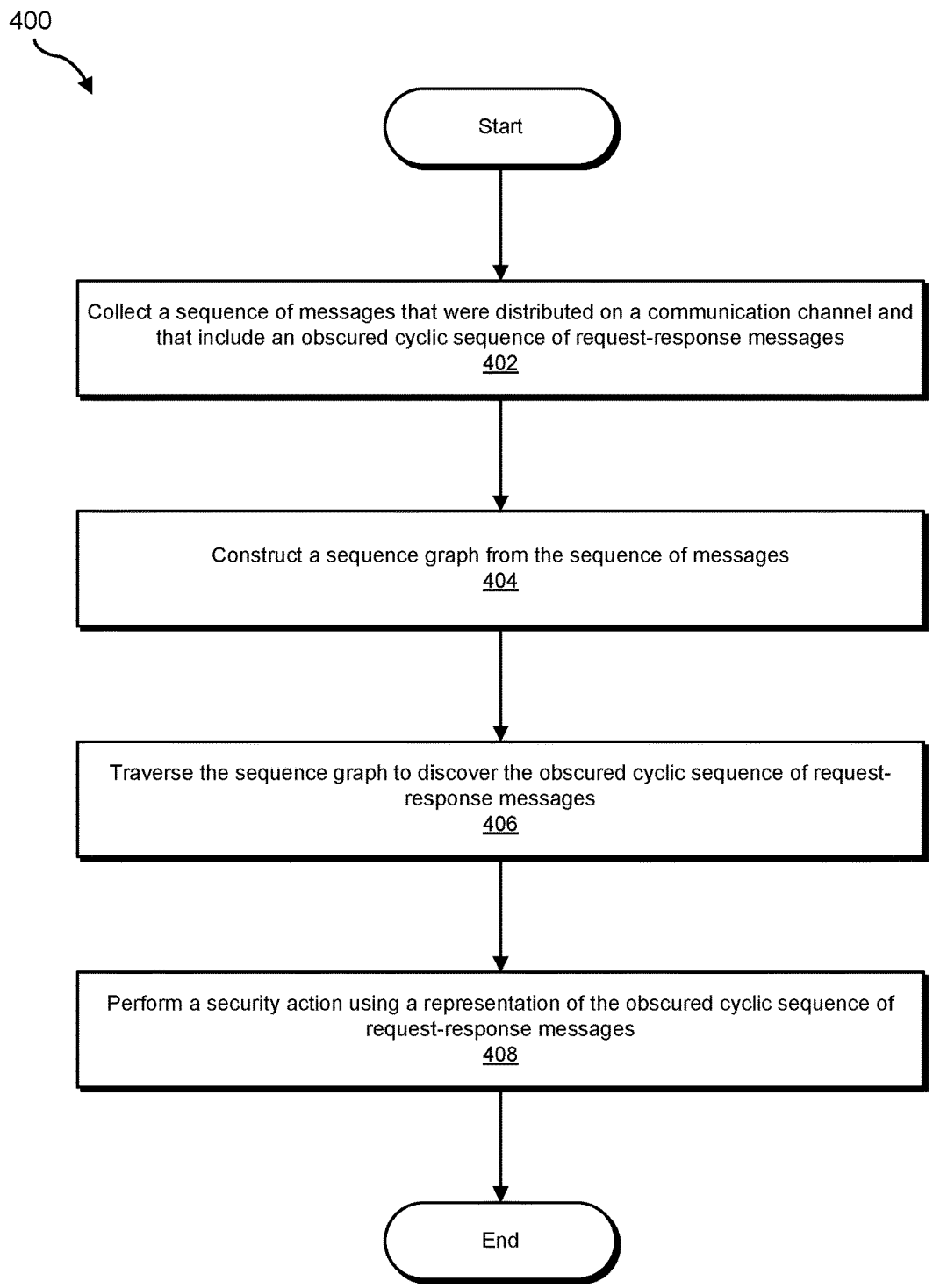
FIG. 4 is a flow diagram of an exemplary method for detecting transactional message sequences that are obscured in multicast communications.

FIG. 4 is a flow diagram of an exemplary computer-implemented method 400 for detecting transactional message sequences that are obscured in multicast communications. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 1610 in FIG. 16, and/or portions of exemplary network architecture 1700 in FIG. 17.

At step 402, one or more of the systems described herein may collect a sequence of messages that were distributed on a communication channel and that include an obscured cyclic sequence of request-response messages. For example, collecting module 104 may, as part of computing device 202 in FIG. 2, collect sequence 212 that was distributed on automobile network 208 and that includes cyclic sequence 214.

Figure 5:
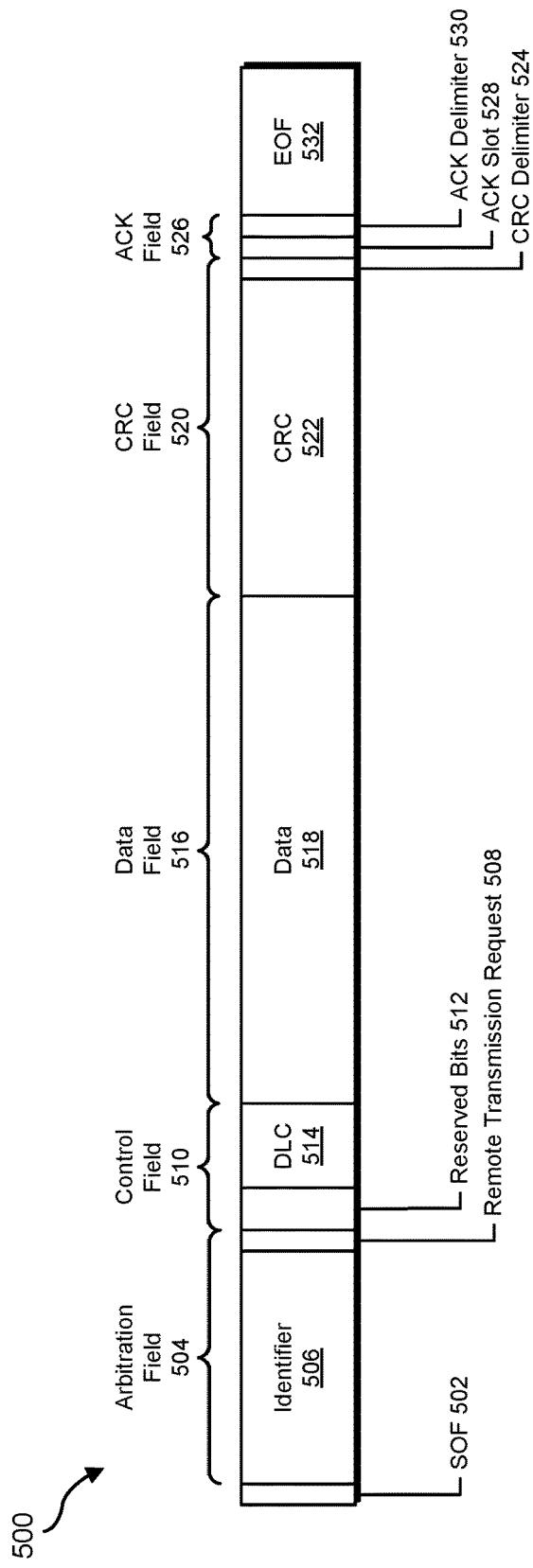
FIG. 5 is a block diagram of an exemplary automobile-network message.

As used herein, the term "message" may refer to any discrete multicast communication (e.g., a packet or frame) that is transmitted over a communication channel (e.g., a physical transmission medium or a logical connection) by a sender to one or more receivers. In some examples, the term "message" may refer to an automobile-network message. As used herein, the term "automobile-network message" may refer to any discrete communication (e.g., a packet or frame) that is transmitted over an automobile network by an automobile component (e.g., an ECU, a sensor, and/or an actuator) that is connected to the automobile network. FIG. 5 illustrates an exemplary automobile-network message 500. As shown, exemplary automobile-network message 500 may represent a standard CAN frame. In this example, automobile-network message 500 may include, without limitation, a Start-Of-Frame (EOF) marker 502. an arbitration field 504, a value of an identifier 506, a value of a remote transmission request 508, a control field 510, a value of Data Length Code (DLC) 514, a data field 516, data 518, a Cyclic-Redundancy-Check (CRC) field 520, a value of a CRC 522, a value of a CRC delimiter 524, an ACK field 526, a value of an ACK slot 528, a value of an ACK delimiter 530, and an End-Of-Frame (EOF) marker 532. As can be seen in FIG. 5, a typical automobile-network message does not contain a source field, a destination field, a source time-stamp, a sequence number, op-codes, and/or other function codes.

In general, the messages described herein do not have destination or source addresses and may be broadcast over a communication channel with no handshaking process between sender and receiver. In addition, each component that broadcasts messages may produce many different types of messages. As a way of distinguishing between messages, a sender may include within any messages that it broadcasts an identifier (e.g., identifier 506 of automobile message 500 in FIG. 5) that indicates a meaning of the message. In some examples, an identifier may have been assigned (perhaps arbitrarily) to a particular message or a particular type of message to indicate the uniqueness of the message or the type of message. For example, an identifier in the form of a unique hex number index may be arbitrarily assigned to a particular unique message (including its data content and the format of its binary payload). More specifically, engineers of a particular edition of an automobile may arbitrarily pair the identifier "0x43E" with the automobile's speedometer-sensor messages. However, the same engineers might later arbitrarily assign the identifier "0x388" to speedometer sensor messages of a later edition of the same automobile (i.e., an automobile of the same year and the same model) and the identifier "0x43E" to a particular type of air-conditioner messages.

Figure 6:
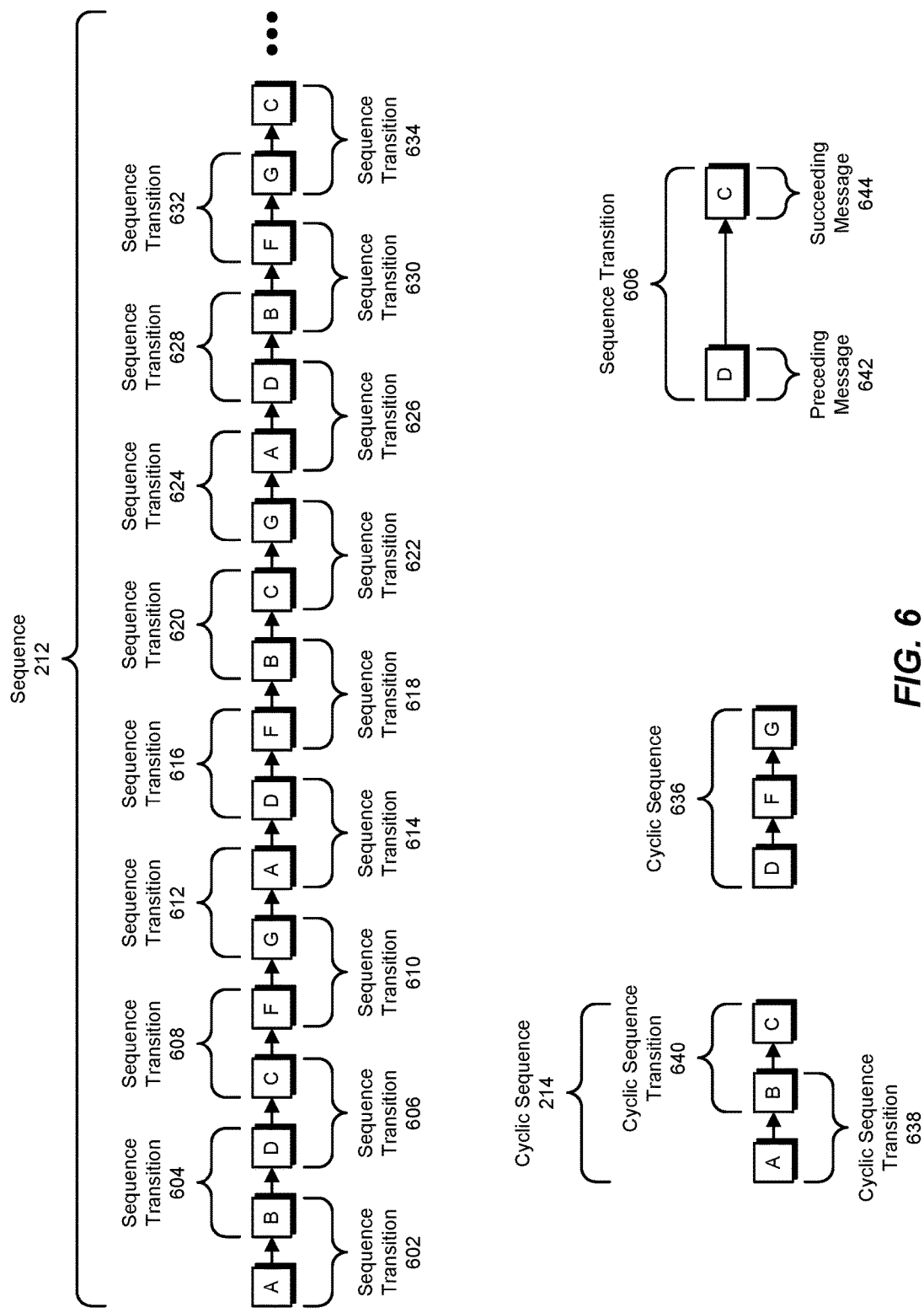
FIG. 6 is a block diagram of exemplary message sequences.

The systems described herein may observe various sequences of messages that are broadcast over a communication channel. As used herein, the term "sequence of messages" generally refers to any serial data stream that is broadcast on a communication channel by one or more senders. An example of a sequence of messages is shown in FIG. 6. In this example, sequence 212 may include the messages (broadcast in the order shown) A, B, D, C, F, G, A, D, F, B, C, G, A, D, B, F, G, and C. In this figure, "A" may represent the identifier of the first message in sequence 212, "B" may represent the identifier of the succeeding message, etc. Messages broadcast over a communication channel may transition from one to another such that one message is preceded and succeeded by other messages. As used herein, the term "sequence transition" generally refers to any direct or immediate transition from one message (a preceding message) to another message (a succeeding message). Sequence transition 606 in FIG. 6 provides an example of a sequence transition within sequence 212. In this example, sequence transition 606 includes a preceding message 642 (a D message) and a succeeding message 644 (a C message).

In general, a sequence of messages may be made up of one or more recurring conversations (e.g., cyclic sequences of request-response messages). As used herein, the term "cyclic sequence of request-response messages" generally refers to any sequence of request and response messages that are exchanged by a group of components and that occur again and again in the same order and/or at regular intervals. Examples of cyclic sequences of request-respond messages are shown in FIG. 6. In these examples, cyclic sequence 214 may represent a recurring conversation between a first group of components and may include the messages (in order) A, B, and C; and cyclic sequence 636 may represent a recurring conversation between a second group of components and may include the messages (in order) D, F, and G. In these examples, an A message may be a request, a B message may be a response to the A message, and a C message may be a response to the B message. Because a B message may be a response to an A message, the time period between any A message and a succeeding B message may be regular (i.e., the sender of a B message may attempt to respond with a B message at a regular interval after receiving an A message). Likewise, because a C message may be a response to a B message, the time period between any B message and a succeeding C message may be regular. Like the messages in cyclic sequence 214, a D message in cyclic sequence 636 may be a request, an F message may be a response to the D message, and a G message may be a response to the F message. Because an F message may be a response to a D message, the time period between any D message and a succeeding F message may be regular. Likewise, because a G message may be a response to an F message, the time period between any F message and a succeeding G message may be regular.

In many situations, conversations among components of one system may appear on an automobile network randomly interleaved with conversations among components of other systems. As shown in FIG. 6, sequence 212 is made up of several occurrences of cyclic sequence 214 interleaved with several occurrences of cyclic sequence 636. As can be seen in FIG. 6, while the messages in cyclic sequence 214 are always in the same order in sequence 212, they are not always preceded or succeeded by the same messages. Likewise, while the messages in cyclic sequence 636 are always in the same order in sequence 212, they are not always preceded or succeeded by the same messages.

Returning now to FIG. 4, collecting module 104 may collect a sequence of messages in a variety of ways. In one example, collecting module 104 may collect a sequence of automobile-network messages by logging, as part of an ECU that is connected to an automobile network and/or a logging device that is connected to the automobile network via a port of the automobile network, the automobile-network messages as they are broadcast over the automobile network. Using FIG. 2 as an example, collecting module 104 may log sequence of messages 212 as they are broadcast over automobile network 208 and received at computing device 202.

Additionally or alternatively, collecting module 104 may collect a sequence of automobile-network messages that were broadcast over an automobile network by receiving the sequence of messages from a device that is connected to the automobile network and that logged the sequence of automobile-network messages when they were broadcast over the automobile network. In general, as part of collecting a sequence of automobile-network messages, collecting module 104 may (i) log the identifier of each message in the sequence of messages, (ii) log the order in which each message in the sequence of messages was observed, (iii) and log the time (an absolute or relative time) at which each message in the sequence of messages was observed.

At step 404, one or more of the systems described herein may construct a sequence graph from the sequence of messages collected at step 402. For example, constructing module 106 may, as part of computing device 202 in FIG. 2, construct a sequence graph 216 from sequence 212.

As used herein, the term "sequence graph" generally refers to any logical, topological, and/or graphical representation of a sequence of messages that is based on how the messages transitioned one from another. As will be described in greater detail below, constructing module 106 may build sequence graphs from information about one or more sequence transitions that occurred within a sequence of messages and may include representations (e.g., nodes) of the unique message identifiers in the sequence of messages that are connected by representations (e.g., edges, such as directed edges) of the sequence transitions in the sequence of messages.

The systems described herein may perform step 404 in any suitable manner. In general, constructing module 106 may construct a sequence graph from a sequence of messages by (i) adding, for each unique message identifier in the sequence of messages, a node to the sequence graph to represent the unique message identifier and (ii) adding, for each unique sequence transition in the sequence of messages from an immediately-preceding message to an immediately-succeeding message, an edge to the sequence graph to represent the unique sequence transition and to connect the node that represents the identifier of the unique sequence transition's immediately-preceding message to the node that represents the identifier of the unique sequence transition's immediately-succeeding message. In some examples, constructing module 106 may connect nodes in a sequence graph using a directed edge that is incident from the node that represents the identifier of the sequence transition's preceding message and incident to the node that represents the identifier of the sequence transition's succeeding message. In some examples, constructing module 106 may use a librarian node (e.g., librarian node 700 in FIG. 7) to keep a record of all of the unique identifiers that a represented in a sequence graph.

Figure 7:
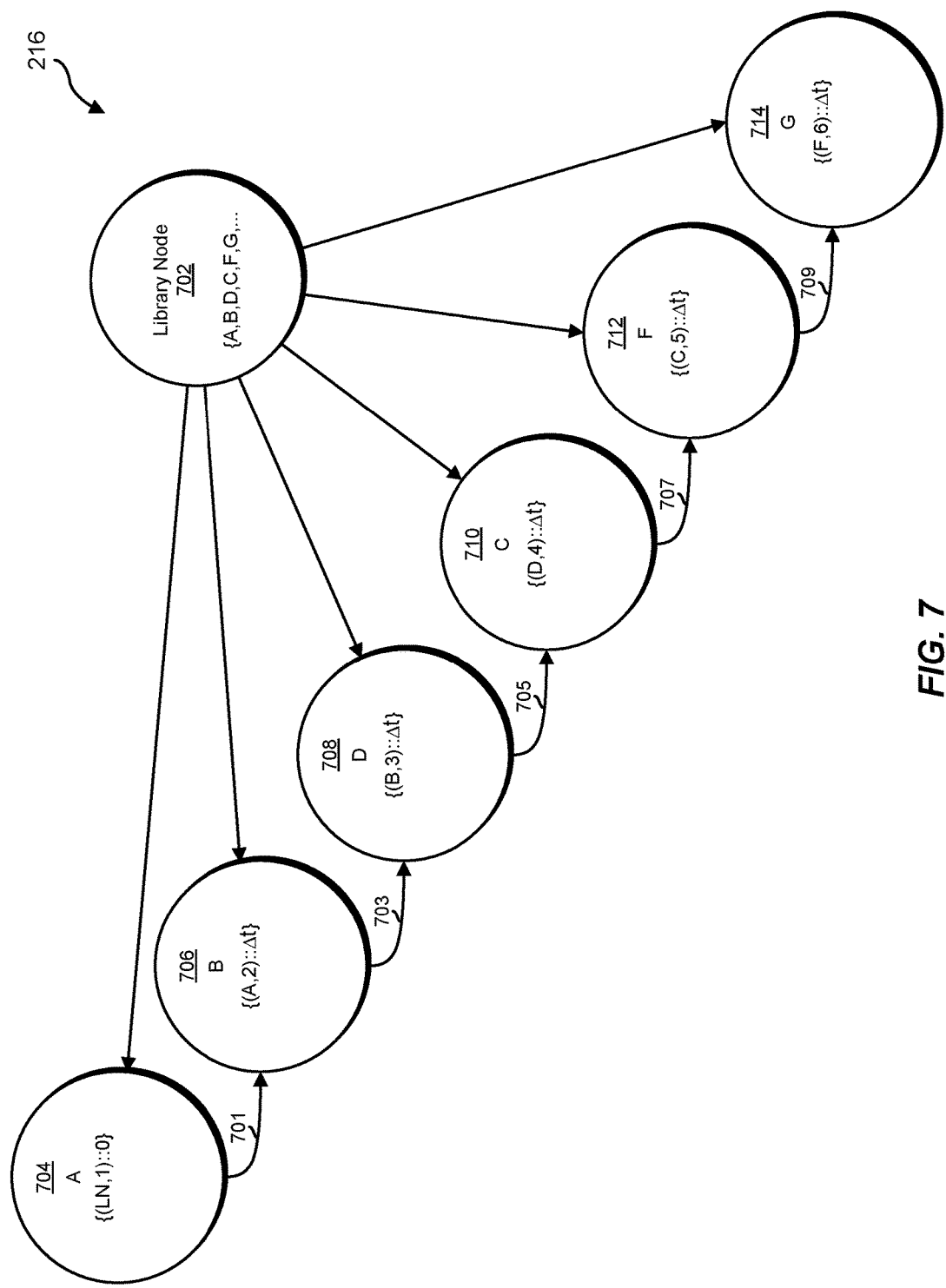
FIG. 7 is a block diagram of an exemplary sequence graph.
Figure 8:
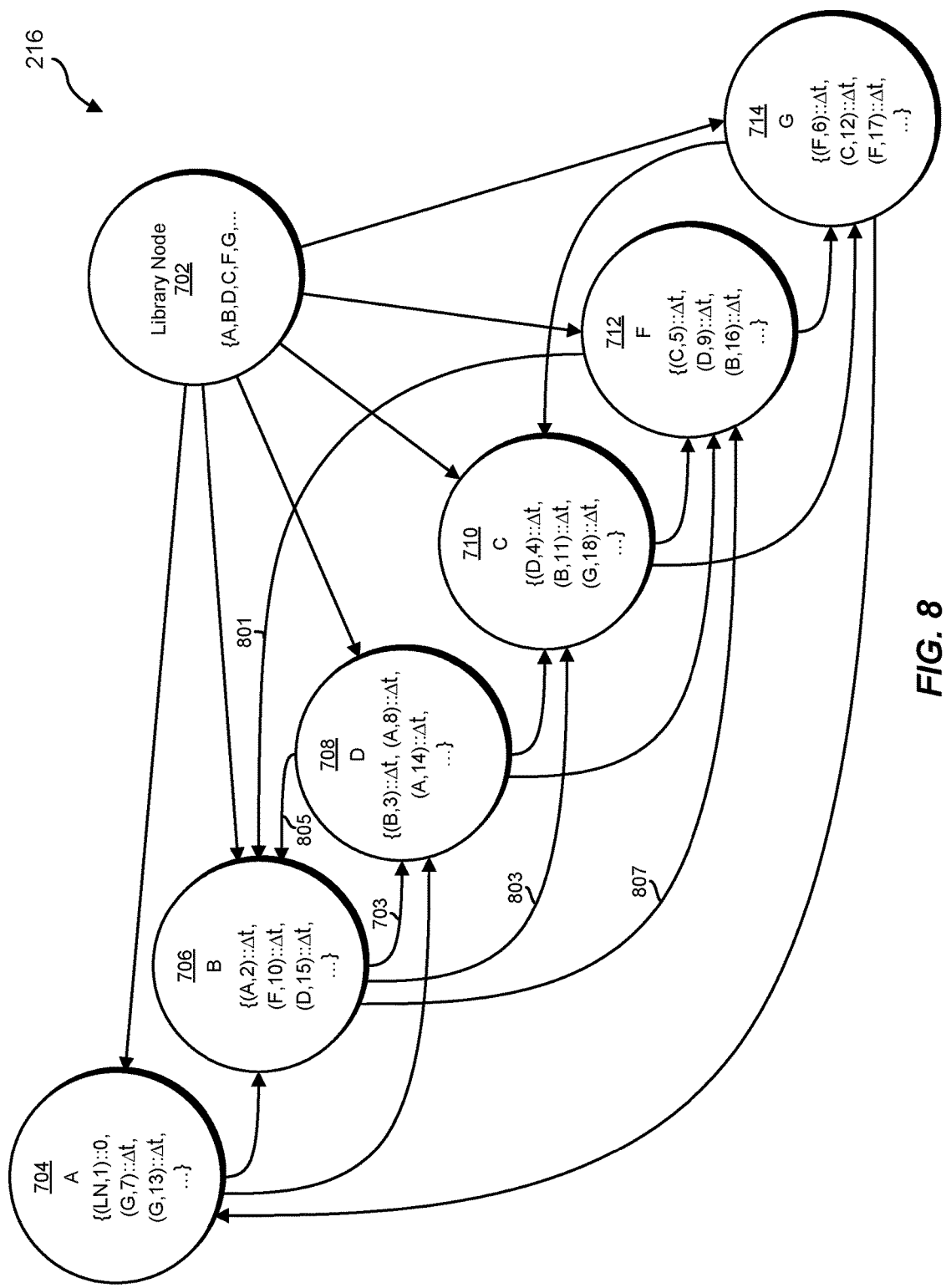
FIG. 8 is a block diagram of an exemplary sequence graph.

FIG. 7 illustrates sequence graph 216 in an initial state after constructing module 106 has processed sequence 212 up to and including the first instance of a G message. As shown, constructing module 106 has added nodes 704, 706, 708, 710, 712, and 714 to sequence graph 216 to represent messages with identifiers A, B, D, C, F, and G, respectively. Constructing module 106 has also added edges 701, 703, 705, 707, and 709 to sequence graph 216 to represent sequence transition 602, sequence transition 604, sequence transition 606, sequence transition 608, and sequence transition 610, respectively. FIG. 8 illustrates sequence graph 216 in a second state after constructing module 106 has processed sequence 212 up to and including the third instance of a C message. As shown, constructing module 106 has added additional edges to sequence graph 216 to represent sequence transitions 612-634. For example, constructing module 106 has added additional edges 801, 803, 805, and 807 to sequence graph 216 to represent the remaining sequence transitions in sequence 212 that involved a B message (i.e., sequence transition 618, 620, 628, and 630, respectively).

In addition to adding and connecting nodes, constructing module 106 may also create, for each node in a sequence graph, a dictionary of sequence transitions (e.g., a collection of key-value pairs) that represents all sequence transitions whose succeeding message is represented by the node. For example, for each sequence transition in a sequence of messages, constructing module 106 may add an entry that represents the sequence transition into the dictionary of the node that represents the sequence transition's succeeding message. In some examples, the entry may include (i) a preceding-message identifier that is equal to the identifier of the sequence transition's preceding message, (ii) a transition order that is equal to the order of the sequence transition in the sequence of messages, and (iii) a time interval equal to the amount of time between observances of the sequence transition's preceding message and the sequence transition's succeeding message. In at least one example, each entry may be in the form of key::value, where the key is a tuple whose elements are the entry's preceding-message identifier and transition order and the value is the entry's time interval. Using FIG. 7 as an example, the entry (A, 2)::Δt in the dictionary of node 706 may represent sequence transition 602 whose preceding-message identifier is "A," whose transition order is "2," and whose time interval is equal to a particular value represented by "Δt."

As illustrated in FIG. 7, after constructing module 106 has processed sequence 212 up to and including the first instance of a G message, constructing module 106 may have added the entry (LN, 1)::0 to the dictionary of node 704 to represent the start of sequence 212, the entry (A, 2)::Δt to the dictionary of node 706 to represent sequence transition 602, the entry (B, 3)::Δt to the dictionary of node 708 to represent sequence transition 604, the entry (D, 4)::Δt to the dictionary of node 710 to represent sequence transition 606, the entry (C, 5)::Δt to the dictionary of node 712 to represent sequence transition 608, and the entry (F, 6)::Δt to the dictionary of node 714 to represent sequence transition 610. As illustrated in FIG. 8, after constructing module 106 has processed sequence 212 up to and including the third instance of a C message, constructing module 106 may have added additional entries to the dictionaries in sequence graph 216 to represent sequence transitions 612-634. For example, constructing module 106 may have added the entry (F, 10)::Δt and the entry (D, 15)::Δt to the dictionary of node 706 to represent sequence transition 618 and sequence transition 628, respectively.

At step 406, one or more of the systems described herein may traverse the sequence graph to discover the obscured cyclic sequence of request-response messages. For example, traversing module 108 may, as part of computing device 202 in FIG. 2, traverse sequence graph 216 to discover obscured cyclic sequence 214.

The systems described herein may perform step 406 in any suitable manner. In general, traversing module 108 may traverse a sequence graph to identify obscure cyclic sequences of request-response messages by (i) iteratively visiting each node in the graph, (ii) determining, at each visited node, whether the entries within the node's dictionary indicate any potential cyclic sequence transitions, (iii) promoting, at each visited node, each of the entries within the node's dictionary to other nodes along the edges in the sequence graph, and (iv) collapsing, after processing each visited node, the sequence graph to remove unneeded or redundant information. Generally, traversing module 108 may select any node in a sequence graph as a starting point of graph traversal.

Upon selecting a node to visit, traversing module 108 may determine whether the entries within the node's dictionary indicate any potential cyclic sequence transitions. As used here, the term "potential cyclic sequence transition" generally refers to any sequence transition that occurs regularly in a sequence of messages with a regular time interval between the occurrence of the sequence transitions preceding message and the occurrence of the sequence transitions succeeding message. In some examples, traversing module 108 may identify a potential cyclic sequence transition by (a) identifying a group of entries in the node's dictionary whose preceding-message identifiers match and (b) determining that the variation (e.g., jitter) in the time intervals of the group's entries is less than a predetermined threshold. The fact that the variation in the time intervals of a group's entries is less than a predetermined threshold may indicate that the sequence transition represented by the groups entries is cyclic. Low variation may indicate intentionally sequential state transitions, generated either by the same component, or by two or more components in conversation during the course of a transaction. Variations that are too large may indicate that the transition examined is not a meaningful cyclic transition. In some examples, traversing module 108 may use a standard deviation measurement or a similar measurement to evaluate time interval stabilities.

Using FIG. 8 as an example, traversing module 108 may begin traversing sequence graph 216 once sequence graph 216 contains a sufficient amount of data. In this example, traversing module 108 may start traversing sequence graph 216 at librarian node 702 and may choose to visit node 706 first. As shown in FIG. 8, the dictionary of node 706 contains the entries (A,2)::Δt, (F,10)::Δt, (D,15)::Δt, . . . , which may represent all immediate transitions to B messages from other messages. Traversing module 108 may group all entries in the dictionary of node 706 by preceding-message identifier and may evaluate each group's time intervals for jitter. For example, traversing module 108 may group all entries with an "A" preceding-message identifier and may evaluate the group's time intervals for jitter. Likewise, traversing module 108 may group all entries with a "F" preceding-message identifier and may evaluate the group's time intervals for jitter. Finally, traversing module 108 may group all entries with a "D" preceding-message identifier and may evaluate the group's time intervals for jitter. In this example, traversing module 108 may determine that the time intervals of the sequence transitions from A messages to B messages have low amounts of variation and indicate that a sequence transition from an A message to a B message is a likely cyclic sequence transition. In addition, traversing module 108 may determine that the time intervals of the sequence transitions from F messages to B messages and the sequence transitions from D messages to B messages have high amounts variation and thus indicate that a sequence transition from a F message to a B message and a sequence transition from a D message to a B message are not likely cyclic sequence transitions.

Returning now to FIG. 4, upon determining whether the entries within a node's dictionary indicate any potential cyclic sequence transitions, traversing module 108 may promote each of the entries within the node's dictionary to other nodes along the edges in the sequence graph. Once promoted, these entries may be used to detect other potential cyclic sequence transitions. In general, traversing module 108 may promote an entry in a node's dictionary along a directed edge incident from the node and incident to an adjacent node by (i) identifying the transition order of the entry, (ii) locating an adjacent entry in the adjacent node's dictionary whose transition order is one more than the transition order of the entry, and (iii) adding an additional entry to the adjacent node's dictionary that may include (a) a preceding-message identifier that is equal to the entry's preceding-message identifier, (b) a transition order that is equal to the transition order of the entry, and (c) a time interval that is equal to a sum of the time interval of the entry and the time interval of the adjacent entry, and (iv) removing the entry from the node's dictionary.

Figure 9:
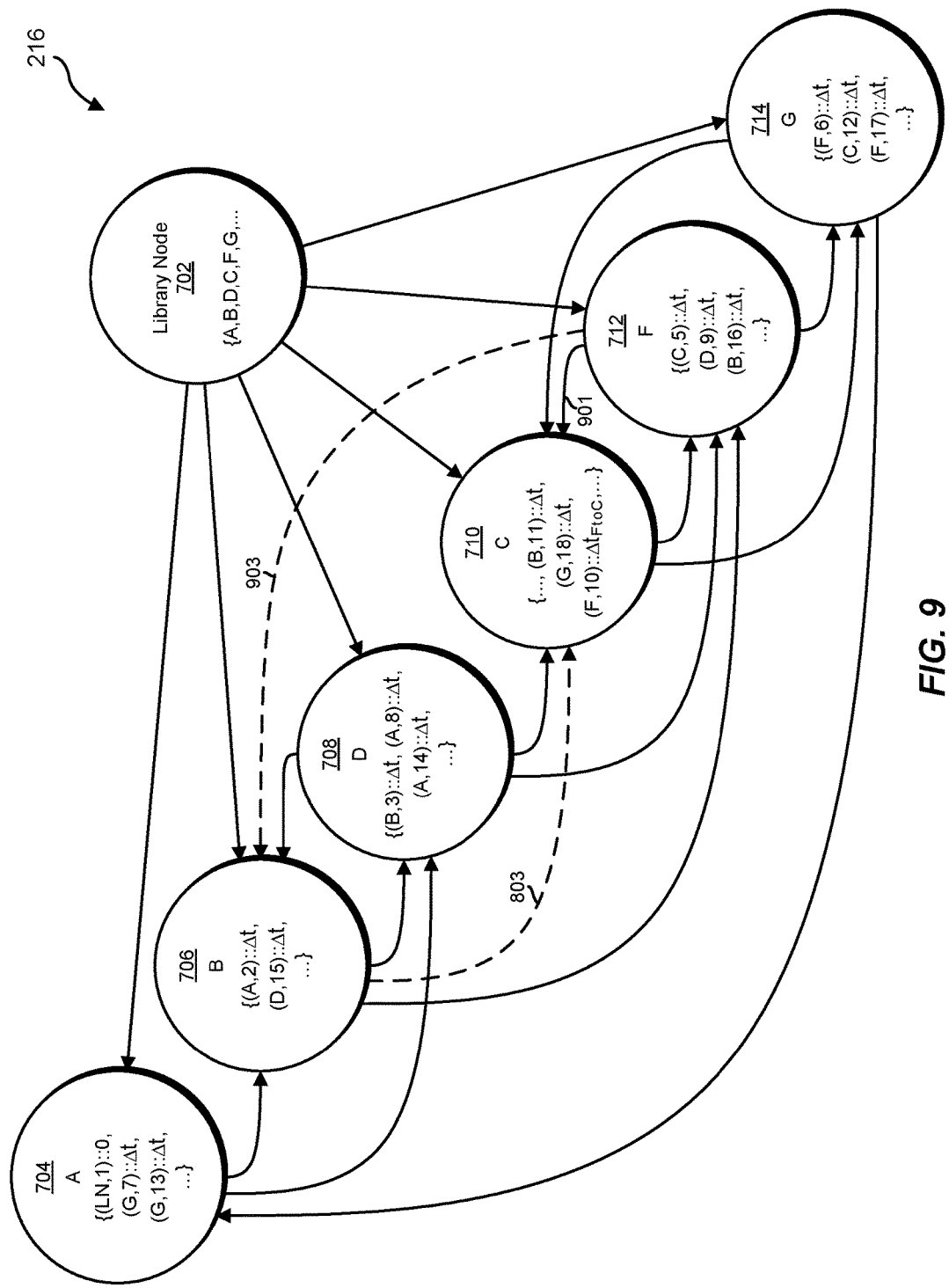
FIG. 9 is a block diagram of an exemplary sequence graph.

Using FIGS. 8 and 9 as an example, upon determining that the sequence transition from an A message to a B message is likely a cyclic sequence transition, traversing module 108 may promote each of the entries within the dictionary of node 706 to other nodes in sequence graph 216 along the directed edges incident from node 706. For example, traversing module 108 may promote the entry (F,10)::Δt by searching the dictionaries of adjacent nodes along edges 703, 803, and 807 for an entry with the next sequence number (i.e., 11). As shown, traversing module 108 may find the entry (B,11)::Δt with the next sequence number in node 710. Traversing module 108 may then store a new entry (F,10)::$\Delta t_{FtoC}$ into the dictionary of node 710. In this example, traversing module 108 may calculate a new time interval for the new entry that is equal to a sum of the time intervals of (F,10)::Δt and (B,11)::Δt. Traversing module 108 may then remove the entry (F,10)::Δt from the dictionary of node 706.

Returning now to FIG. 4, upon promoting all the entries within a node's dictionary that share the same preceding-message identifier, traversing module 108 may update the sequence graph to reflect the promotions. For example, traversing module 108 may add an additional directed edge, if it does not already exist, to the sequence graph that is incident from the node that represents an entry's previous-message identifier and incident to the adjacent node to which the entries were promoted and (ii) remove, from the sequence graph, each directed edge that is incident from the node that represents the entry's previous-message identifier and incident to the node. Using FIG. 9 as an example, after promoting the entry (F,10)::Δt and all other entries with F as their preceding-message identifier from the dictionary of node 706, traversing module 108 may add a new edge 901 to sequence graph 216 that connects node 712 to node 710 and may remove edges 803 and 903 from sequence graph 216. Edge 901 may represent a new possible cyclic sequence transition from F messages to C messages. The edge from node 706 to node 710 may be deleted since there are no more sequence transitions remaining in the dictionary of node 706 that transition directly to C messages. The edge from node 712 to node 706 may be deleted since B messages belong to an already discovered cyclic sequence.

Figure 10:
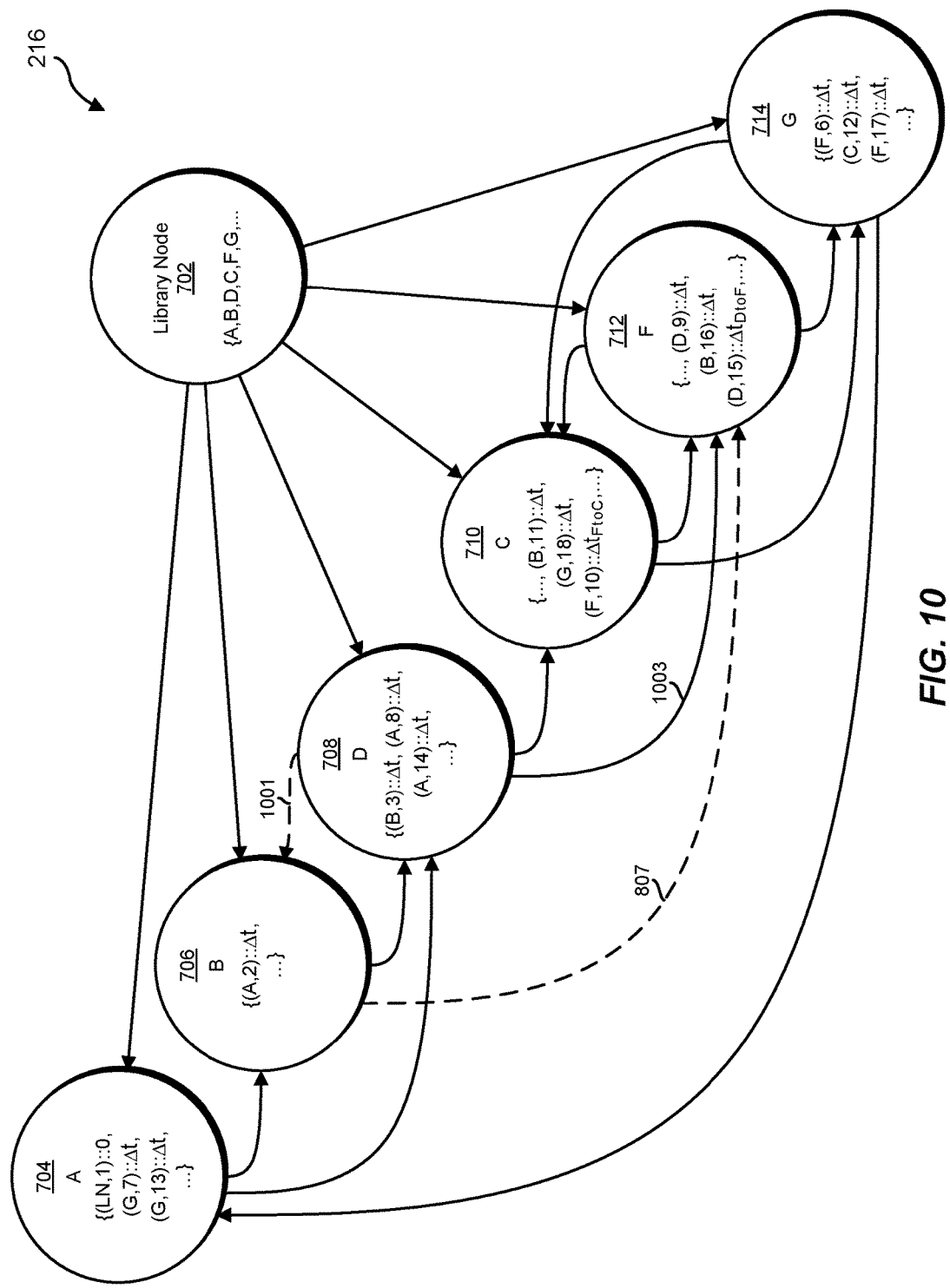
FIG. 10 is a block diagram of an exemplary sequence graph.

Continuing with the example illustrated in FIG. 9, upon promoting entries whose preceding-message identifier is equal to F, traversing module 108 may continue to promote each of the entries within the dictionary of node 706 to other nodes in sequence graph 216 along the directed edges incident from node 706. As illustrated in FIGS. 9 and 10, traversing module 108 may next promote the entry (D,15):: Δt by searching the dictionaries of adjacent nodes along edges 703 and 807 for an entry with the next sequence number (i.e., 16). As shown, traversing module 108 may find the entry (B,16)::Δt with the next sequence number in node 712. Traversing module 108 may then store a new entry (D,15)::$\Delta t_{DtoF}$ to the dictionary of node 712. In this example, traversing module 108 may calculate a new time interval for the new entry that is equal to the sum of the time intervals of (F,10)::Δt and (B,11)::Δt. After promoting the entry (D,15)::Δt and all other entries with D as their preceding-message identifier from the dictionary of node 706, traversing module 108 may remove edges 807 and 1001 from sequence graph 216 and may verify that an edge 1003 already connects node 708 to node 712.

Figure 11:
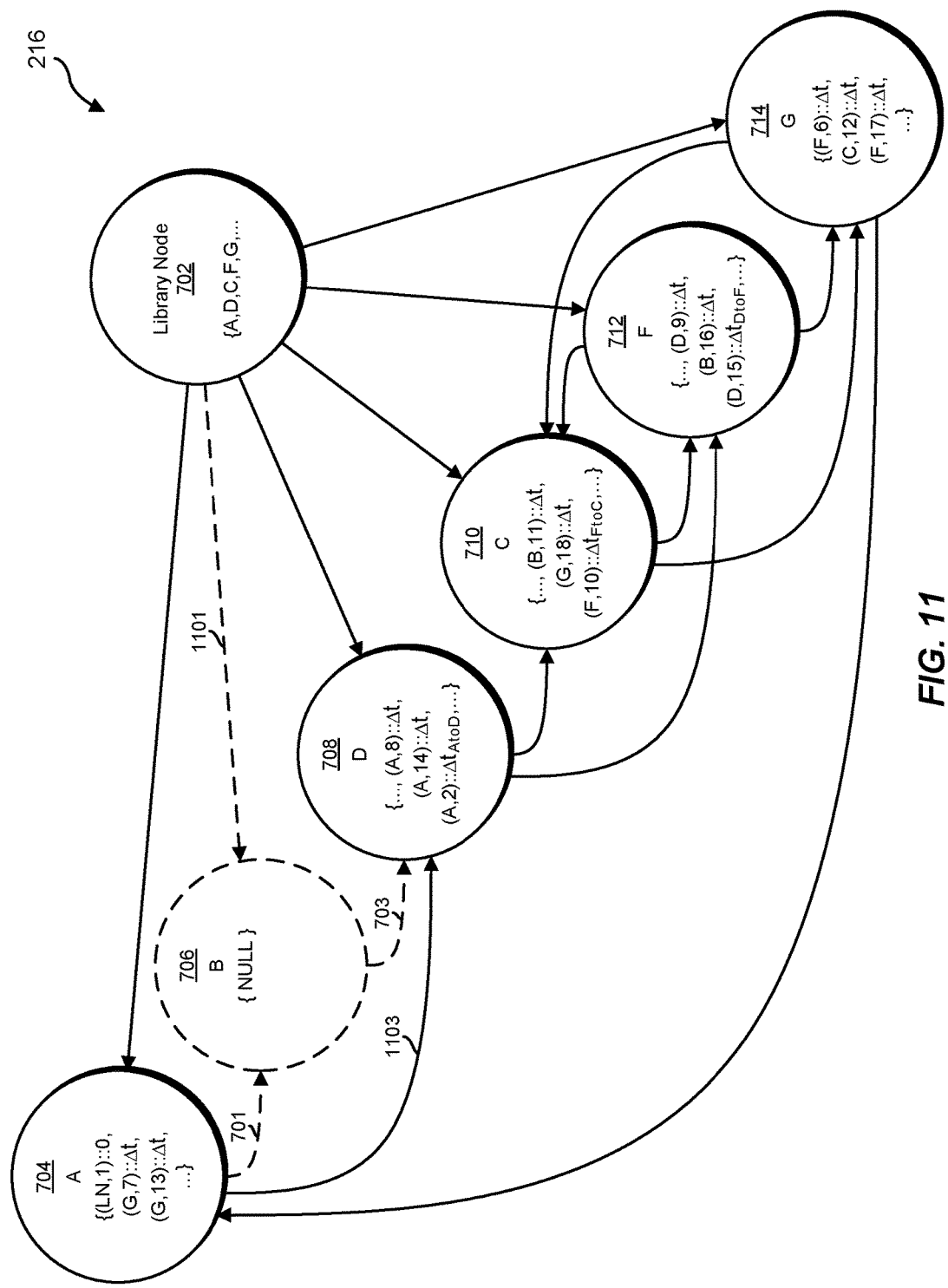
FIG. 11 is a block diagram of an exemplary sequence graph.

Upon promoting entries whose preceding-message identifier is equal to D, traversing module 108 may continue to promote each of the remaining entries within the dictionary of node 706 to other nodes in sequence graph 216 along the directed edge incident from node 706. As illustrated in FIGS. 10 and 11, traversing module 108 may next promote the entry (A,2)::Δt by searching the dictionary of an adjacent node along edge 703 for an entry with the next sequence number (i.e., 3). As shown, traversing module 108 may find the entry (B,3)::Δt with the next sequence number in node 708. Traversing module 108 may then store a new entry (A,2)::$\Delta t_{AtoD}$ to the dictionary of node 708. In this example, traversing module 108 may calculate a new time interval for the new entry that is equal to the sum of the time intervals of (A,2)::Δt and (B,3)::Δt. After promoting the entry (A,2):: Δt and all other entries with A as their preceding-message identifier, traversing module 108 may remove edge 701 from sequence graph 214 since all relevant transitions along that path have already been discovered, may remove edge 703 from sequence graph 214 since there are no more sequence transitions in the dictionary of node 706 that transition directly to D messages, and may verify that an edge 1103 already connects node 704 to node 708. Since node 706 has been completely processed (i.e., node 706 does not contain any more sequence transition entries), traversing module 108 may delete node 706 and edge 1101 from sequence graph 216 since it may no longer hold unique information for further sequence transition analysis and may update librarian node 702 to reflect the deletion of node 706.

In some examples, before deleting a node from a sequence graph, traversing module 108 may determine whether the identifier that is represented by the node is an identifier of a proceeding message of an already discovered cyclic sequence transition. If it is, traversing module 108 may remove, from the dictionary of each node in the sequence graph, all entries whose preceding-message identifier matches the identifier that is represented by the node and that represents a sequence transition in an original observed sequence of messages. In the examples above, a potential cyclic sequence transition had been discovered where an A message was the preceding message and a B message was the succeeding message. For this reason, traversing module 108 did not delete sequence-transition entries from other nodes in sequence graph 214.

Figure 12:
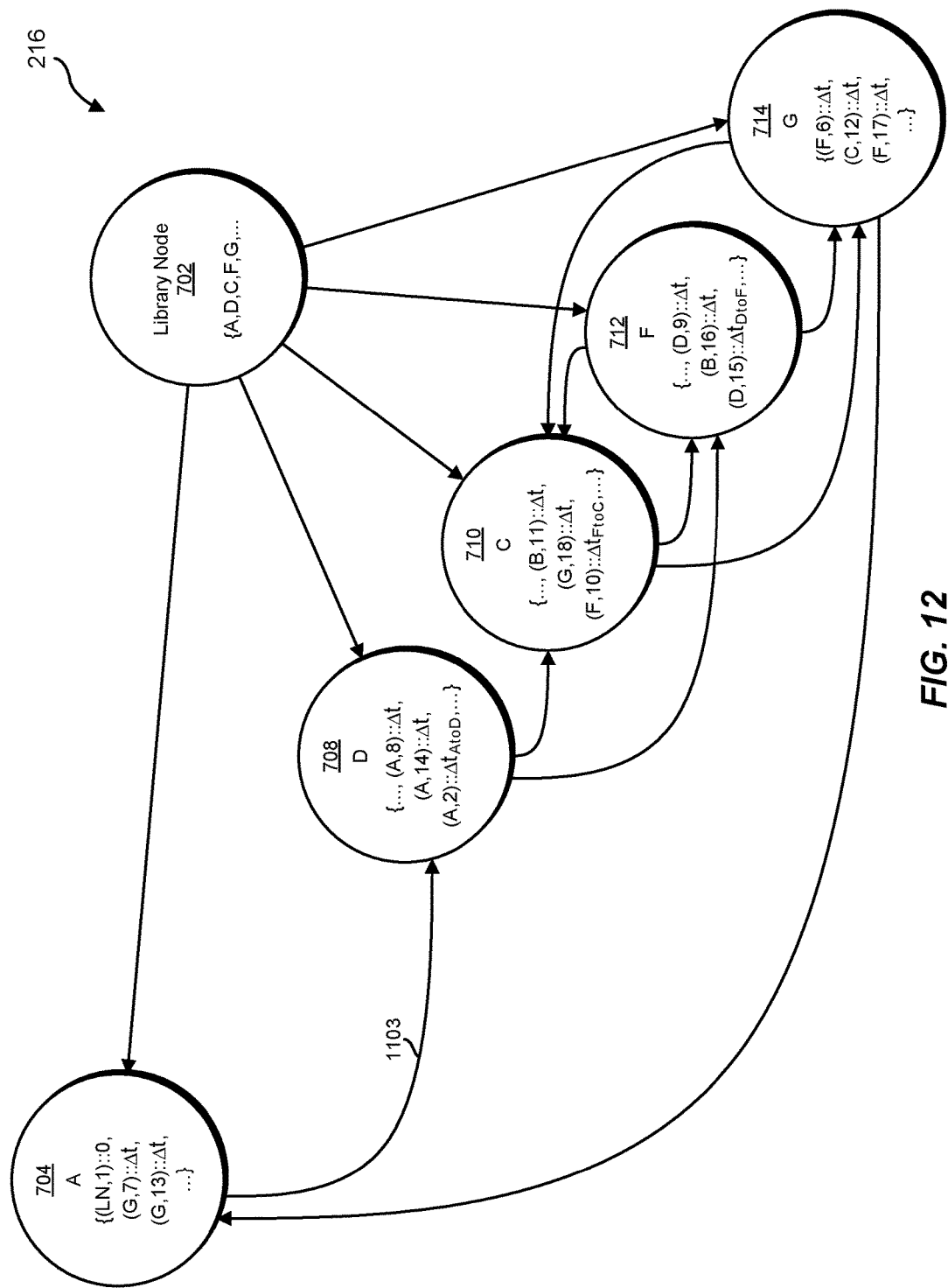
FIG. 12 is a block diagram of an exemplary sequence graph.
Figure 13:
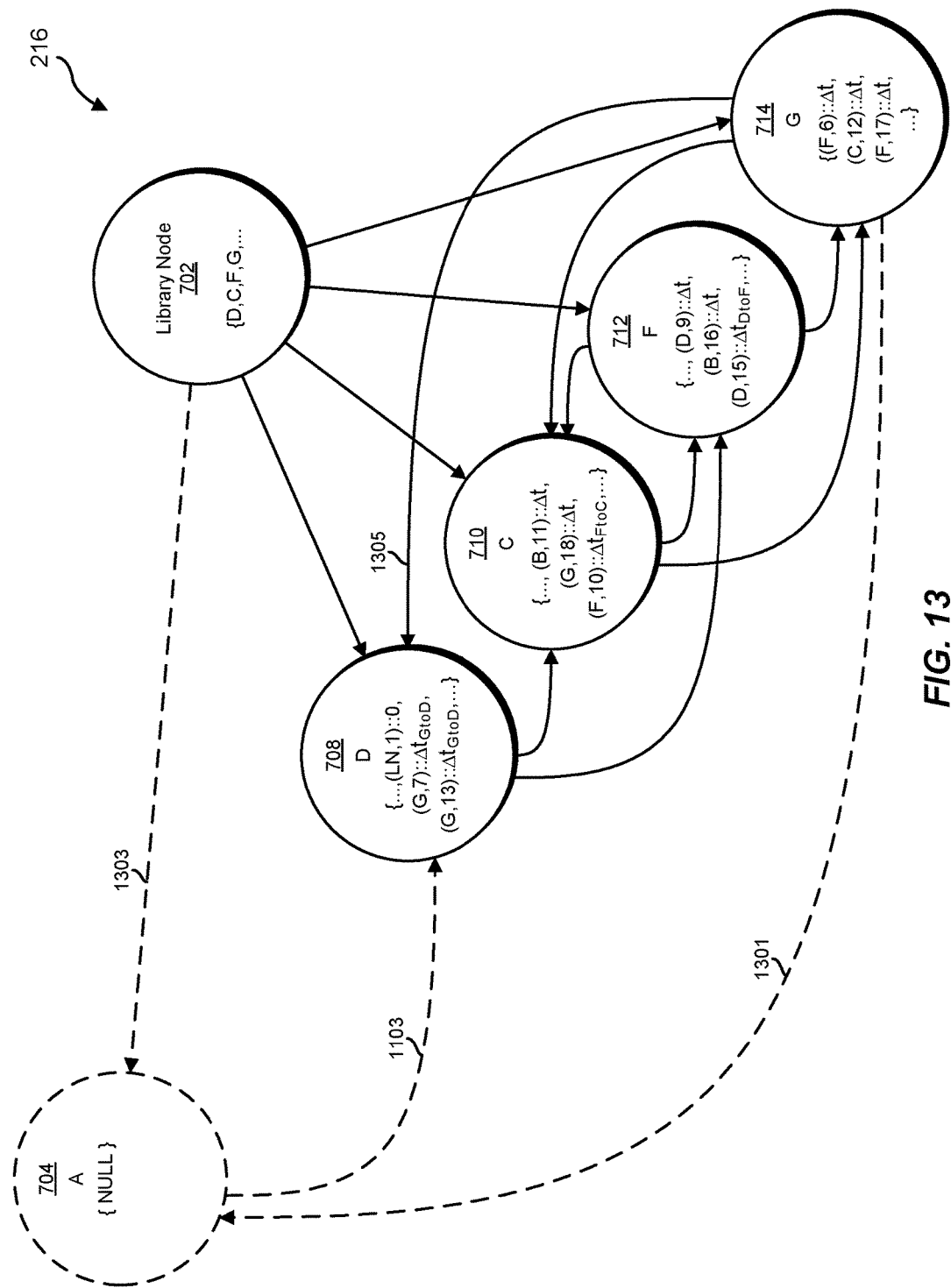
FIG. 13 is a block diagram of an exemplary sequence graph.
Figure 14:
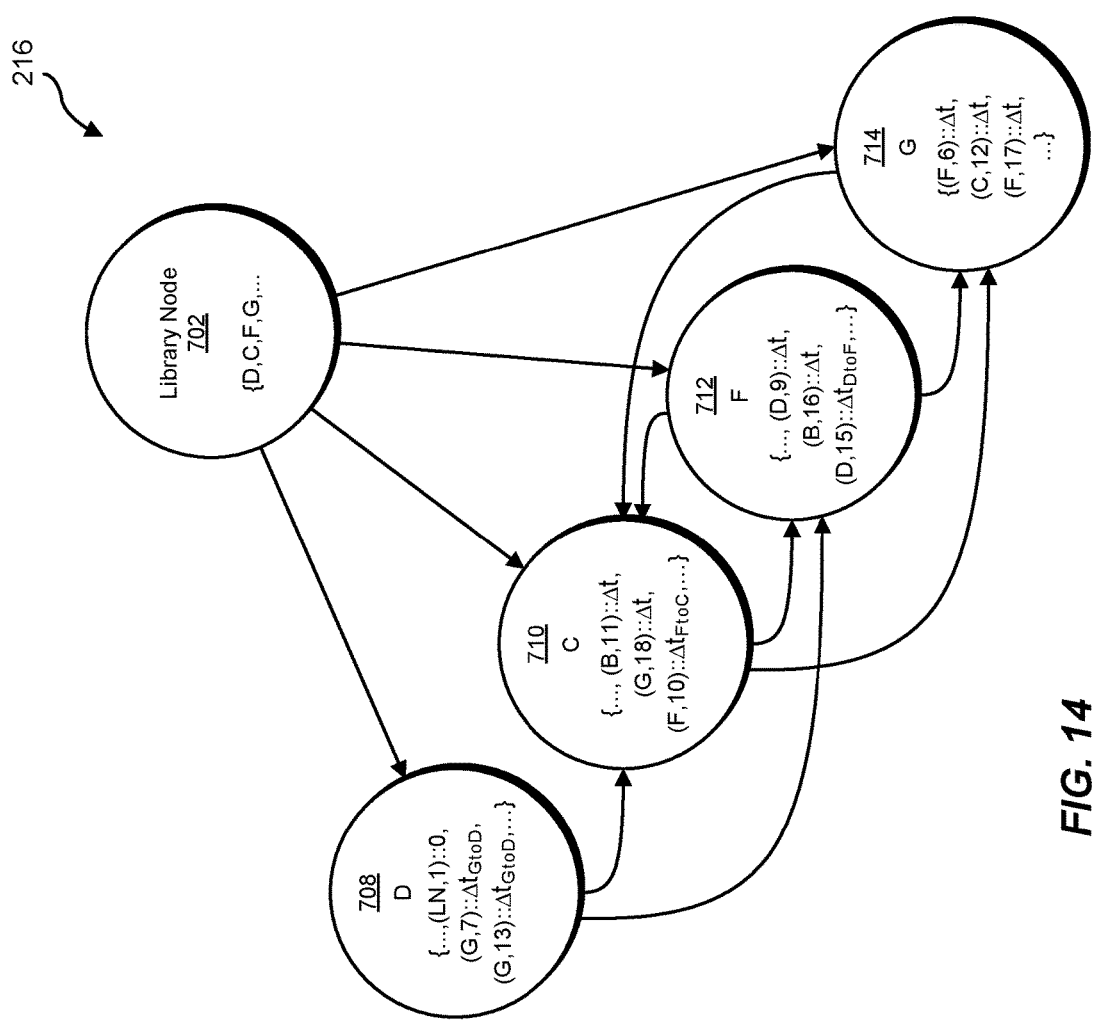
FIG. 14 is a block diagram of an exemplary sequence graph.

FIGS. 12-14 illustrate the processing of node 704 whose identifier is an identifier of the proceeding message of the discovered cyclic sequence transition discussed above. In this example, upon determining whether the entries within the dictionary of node 704 indicate any potential cyclic sequence transitions, traversing module 108 may promote each of the entries within the dictionary to other nodes along edge 1103 in sequence graph 216. For example, traversing module 108 may promote the entry (G,7)::Δt by searching the dictionary of an adjacent node along edge 1103 for an entry with the next sequence number (i.e., 8). As shown, traversing module 108 may find the entry (A,8)::Δt with the next sequence number in node 708. As shown in FIG. 13, traversing module 108 may then store a new entry (G,7):: $\Delta t_{GtoD}$ into the dictionary of node 708. In this example, traversing module 108 may calculate a new time interval for the new entry that is equal to a sum of the time intervals of (G, 7)::Δt and (A,8)::Δt. Traversing module 108 may also promote the entry (G,13)::Δt by searching the dictionary of the adjacent node along edge 1103 for an entry with the next sequence number (i.e., 14). As shown, traversing module 108 may find the entry (A,14)::Δt with the next sequence number in node 708. As shown in FIG. 13, traversing module 108 may then store a new entry (G,13)::$\Delta t_{GtoD}$ into the dictionary of node 708. In this example, traversing module 108 may calculate a new time interval for the new entry that is equal to a sum of the time intervals of (G, 13)::Δt and (A,14)::Δt.

Before deleting node 704 from sequence graph 216, traversing module 108 may determine whether an A message is the proceeding message of an already discovered cyclic sequence transition. In this case, a potential cyclic sequence transition had been found where an A message was the preceding message. For this reason, traversing module 108 may remove, from the dictionary of each node in sequence graph 216, all entries whose preceding-message identifier is A and that represent sequence transitions in sequence 212. In this example, traversing module 108 may delete the entries (A,8)::Δt, (A,14)::Δt, (A,2)::Δt2, etc. from dictionaries in sequence graph 216 since they may no longer contain any unique information. After promoting the entries (G,7)::Δt and (G,13)::Δt, traversing module 108 may remove edges 1103, 1301, and 1303 from sequence graph 216, add an edge 1305 to connect node 714 to node 708, remove node 704, and update librarian node 700.

Returning now to FIG. 4, upon discovering each sequence transition of an obscured cyclic sequence of request-response messages, traversing module 108 may store a representation of the obscured cyclic sequence. In at least one example, traversing module 108 may create a state machine to represent an obscured cyclic sequence of request-response messages by adding a representation of each of the obscured cyclic sequence's potential cyclic sequence transitions to the state machine. Traversing module 108 may add a representation of a potential cyclic sequence transition to a state machine by (i) adding, to the state machine, a first state to represent the identifier of the potential cyclic sequence transition's preceding message, (ii) adding, to the state machine, a second state to represent the identifier of the potential cyclic sequence transition's succeeding message, and (iii) adding, to the state machine, a transition from the first state to the second state.

Figure 15:
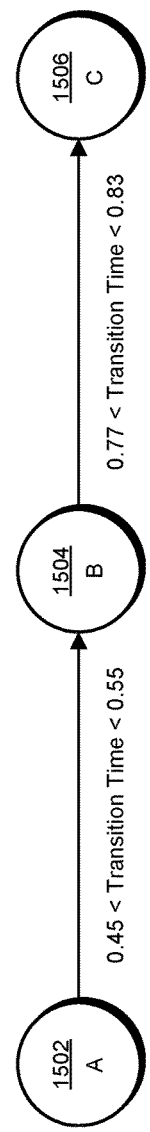
FIG. 15 is a block diagram of an exemplary state machine.

Using FIG. 15 as an example, upon discovering each sequence transition of cyclic sequence 214, traversing module 108 may store a representation of cyclic sequence 214 as exemplary state machine 218. In at least one example, traversing module 108 may create state machine 218 to represent cyclic sequence 214 by adding a representation of the first and second sequence transitions of cyclic sequence 214 to state machine 218. As shown, traversing module 108 may add a representation of the first potential cyclic sequence transition of cyclic sequence 214 (i.e., cyclic sequence transition 638) to state machine 218 by (i) adding, to state machine 218, a state 1502 to represent the identifier of the preceding message of cyclic sequence transition 638 (i.e., "A"), (ii) adding, to state machine 218, a state 1504 to represent the identifier the succeeding message of message of cyclic sequence transition 638 (i.e., "B"), and (iii) adding, to state machine 218, a transition from state 1502 to state 1504. Similarly, traversing module 108 may add a representation of the second potential cyclic sequence transition of cyclic sequence 214 (i.e., cyclic sequence transition 640) to state machine 218 by (ii) adding, to state machine 218, a state 1506 to represent the identifier of the succeeding message of cyclic sequence transition 640 (i.e., "C") and (iii) adding, to state machine 218, a transition from state 1504 to state 1506. As shown, traversing module 108 may also add a guard condition to each of the state transitions in state machine 218 that requires each transition to occur within a predetermined amount of time.

At step 408, one or more of the systems described herein may perform a security action using a representation of the obscured cyclic sequence of request-response messages. For example, security module 110 may, as part of computing device 202 in FIG. 2, perform a security action using state machine 218 that represents obscured cyclic sequence 214.

The systems described herein may perform a variety of security actions using a representation of an obscured cyclic sequence of request-response messages. In some examples, security module 110 may use a representation of an obscured cyclic sequence of request-response messages as a baseline to which additional sequences of messages may be compared and with which anomalies in the additional sequences of messages may be detected. In some examples, security module 110 may use a state machine that represents a cyclic sequence of request-response messages to detect when a component involved broadcasting messages in the cyclic sequence has malfunctioned or to detect a malicious attack that generates additional messages that are out of sync with the cyclic sequence. In response to detecting a malfunctioning component or a malicious attack, security module 110 may report the event to an interested party (e.g., a driver, an automobile manufacture, a security-service provider, etc.). Additionally or alternatively, security module 110 may perform a security action that prevents a malfunctioning component or a malicious attack from causing damage or harm.

Under some circumstances, message retransmissions may occur on a communication channel as a result of bus collisions, which may result in lost messages and/or subsequent resent messages. In such cases, security module 110 may suspend any timing rules to allow these scenarios to play out but may ensure that the order of messages are enforced. For example, if a potential cyclic sequence of messages has been identified that includes A messages followed by B messages followed by C messages followed by D messages and security module 110 detects an A message followed by two or more B messages followed by a C message followed by a D message, security module 110 may determine that the anomaly is a result of a message being resent and may not flag the anomaly. Alternatively, if security module 110 detects an A message followed by a B message followed by a D message, security module 110 may determine that the anomaly is a potential security threat and may flag it as such.

In some examples, security module 110 may use a state machine that represents a potential cyclic sequence of request-response messages to detect anomalies in an additional sequence of messages that may suggest that the potential cyclic sequences discovered at step 406 should be updated. For example, security module 110 may use a state machine that represents a potential cyclic sequence of request-response messages to detect anomalies in an additional sequence of messages that may suggest that the potential cyclic sequence may actually be two or more cyclic sequences that were nearly synchronous in the sequence of messages used to identify the potential cyclic sequence. For example, in a first sequence of messages a potential cyclic sequence of messages may have been identified that included an A message followed by a C message followed by a B message followed by a D message. Later during an anomaly detection phase, security module 110 may detect that the occurrences of the messages of the potential cyclic sequence have slowly drifted apart, which may indicate that the potential cyclic sequence is actually two or more cyclic sequences. For example, security module 110 may later detect an A message followed by a B message followed by a C message followed by a D message.

In some examples, security module 110 may use a state machine that represents a potential cyclic sequence of request-response messages to detect anomalies in an additional sequence of messages that may suggest that the potential cyclic sequence may actually be one of two or more possible cyclic sequences of request-response messages of a set of components (e.g., a set of components that includes a master that broadcasts a request for multiple slave responses or a set of components that includes multiple masters that broadcast requests for the same response message).

As explained above, by traversing a sequence graph that was created from a sequence of messages that were broadcast over a multicast communication channel (e.g., an automobile network), the systems and methods described herein may enable the discovery of cyclic (or recurring) sequences of request-response messages that are exchanged between a group of devices whose cyclic sequences of request-response messages are interleaved with and obscured by other messages that are also broadcast over the same multicast communication channel (e.g., cyclic sequences of request-response messages of other groups of devices). Furthermore, in some examples, by discovering cyclic sequences of request-response messages that were broadcast over the multicast communication channel, these systems and methods may enable the detection of anomalous messages within the multicast communication channel (e.g., messages of an attack on the communication channel or messages of malfunctioning devices).

Figure 16:
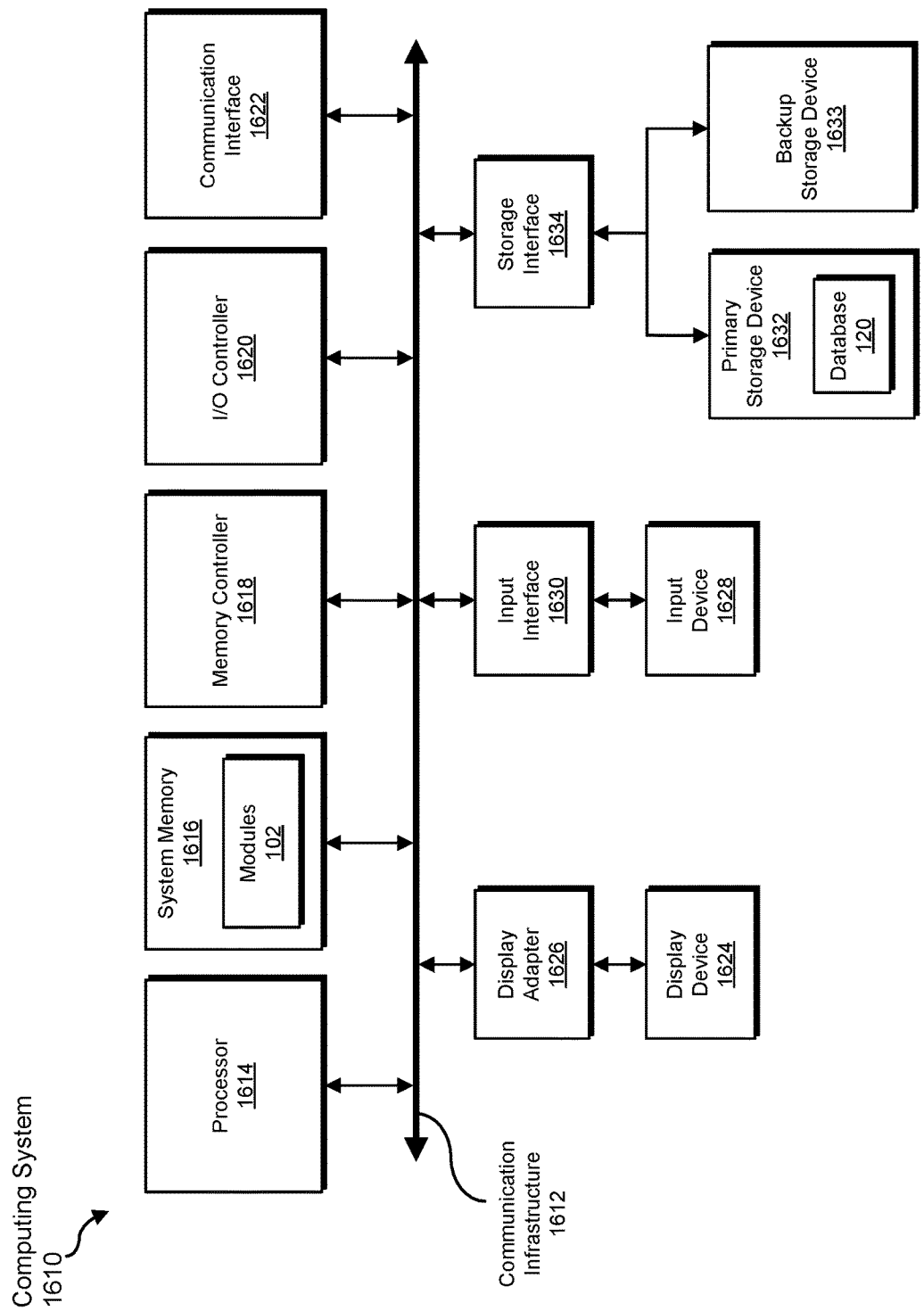
FIG. 16 is a block diagram of an exemplary computing system capable of implementing one or more of the embodiments described and/or illustrated herein.

FIG. 16 is a block diagram of an exemplary computing system 1610 capable of implementing one or more of the embodiments described and/or illustrated herein. For example, all or a portion of computing system 1610 may perform and/or be a means for performing, either alone or in combination with other elements, one or more of the steps described herein (such as one or more of the steps illustrated in FIG. 4). All or a portion of computing system 1610 may also perform and/or be a means for performing any other steps, methods, or processes described and/or illustrated herein.

Computing system 1610 broadly represents any single or multi-processor computing device or system capable of executing computer-readable instructions. Examples of computing system 1610 include, without limitation, workstations, laptops, client-side terminals, servers, distributed computing systems, handheld devices, or any other computing system or device. In its most basic configuration, computing system 1610 may include at least one processor 1614 and a system memory 1616.

Processor 1614 generally represents any type or form of physical processing unit (e.g., a hardware-implemented central processing unit) capable of processing data or interpreting and executing instructions. In certain embodiments, processor 1614 may receive instructions from a software application or module. These instructions may cause processor 1614 to perform the functions of one or more of the exemplary embodiments described and/or illustrated herein.

System memory 1616 generally represents any type or form of volatile or non-volatile storage device or medium capable of storing data and/or other computer-readable instructions. Examples of system memory 1616 include, without limitation, Random Access Memory (RAM), Read Only Memory (ROM), flash memory, or any other suitable memory device. Although not required, in certain embodiments computing system 1610 may include both a volatile memory unit (such as, for example, system memory 1616) and a non-volatile storage device (such as, for example, primary storage device 1632, as described in detail below). In one example, one or more of modules 102 from FIG. 1 may be loaded into system memory 1616.

In certain embodiments, exemplary computing system 1610 may also include one or more components or elements in addition to processor 1614 and system memory 1616. For example, as illustrated in FIG. 16, computing system 1610 may include a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an Industry Standard Architecture (ISA), Peripheral Component Interconnect (PCI), PCI Express (PCIe), or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612.

I/O controller 1620 generally represents any type or form of module capable of coordinating and/or controlling the input and output functions of a computing device. For example, in certain embodiments I/O controller 1620 may control or facilitate transfer of data between one or more elements of computing system 1610, such as processor 1614, system memory 1616, communication interface 1622, display adapter 1626, input interface 1630, and storage interface 1634.

Communication interface 1622 broadly represents any type or form of communication device or adapter capable of facilitating communication between exemplary computing system 1610 and one or more additional devices. For example, in certain embodiments communication interface 1622 may facilitate communication between computing system 1610 and a private or public network including additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution.

As illustrated in FIG. 16, computing system 1610 may also include at least one display device 1624 coupled to communication infrastructure 1612 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer, as known in the art) for display on display device 1624.

As illustrated in FIG. 16, exemplary computing system 1610 may also include at least one input device 1628 coupled to communication infrastructure 1612 via an input interface 1630. Input device 1628 generally represents any type or form of input device capable of providing input, either computer or human generated, to exemplary computing system 1610. Examples of input device 1628 include, without limitation, a keyboard, a pointing device, a speech recognition device, or any other input device.

As illustrated in FIG. 16, exemplary computing system 1610 may also include a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a solid state drive, a floppy disk drive, a magnetic tape drive, an optical disk drive, a flash drive, or the like. Storage interface 1634 generally represents any type or form of interface or device for transferring data between storage devices 1632 and 1633 and other components of computing system 1610. In one example, database 120 from FIG. 1 may be stored in primary storage device 1632.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also include other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may also be a part of computing system 1610 or may be a separate device accessed through other interface systems.

Many other devices or subsystems may be connected to computing system 1610. Conversely, all of the components and devices illustrated in FIG. 16 need not be present to practice the embodiments described and/or illustrated herein. The devices and subsystems referenced above may also be interconnected in different ways from that shown in FIG. 16. Computing system 1610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1610. All or a portion of the computer program stored on the computer-readable medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1610 may be configured as an Application Specific Integrated Circuit (ASIC) adapted to implement one or more of the exemplary embodiments disclosed herein.

Figure 17:
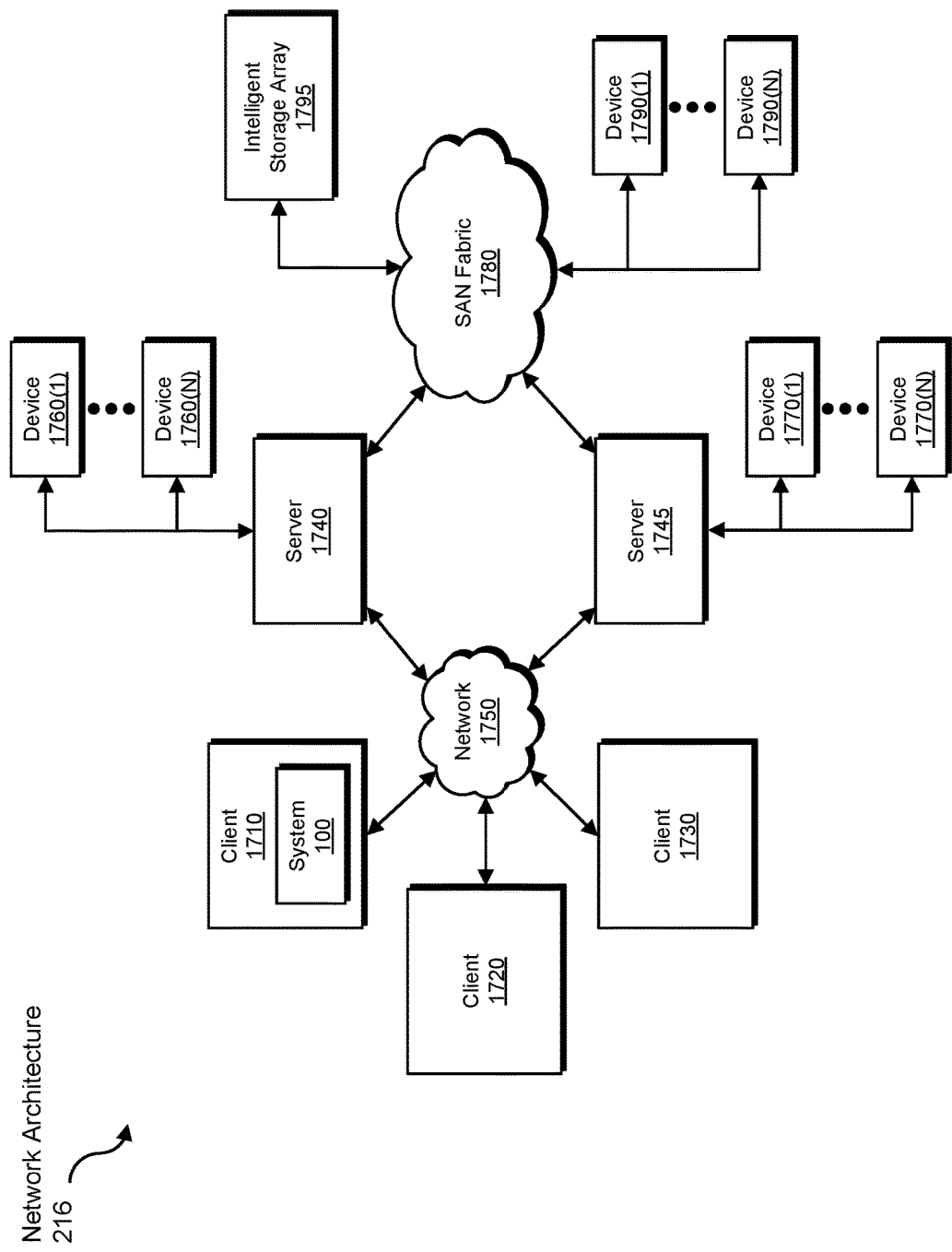
FIG. 17 is a block diagram of an exemplary computing network capable of implementing one or more of the embodiments described and/or illustrated herein.

FIG. 17 is a block diagram of an exemplary network architecture 1700 in which client systems 1710, 1720, and 1730 and servers 1740 and 1745 may be coupled to a network 1750. As detailed above, all or a portion of network architecture 1700 may perform and/or be a means for performing, either alone or in combination with other elements, one or more of the steps disclosed herein (such as one or more of the steps illustrated in FIG. 4). All or a portion of network architecture 1700 may also be used to perform and/or be a means for performing other steps and features set forth in the instant disclosure.

Client systems 1710, 1720, and 1730 generally represent any type or form of computing device or system, such as exemplary computing system 1610 in FIG. 16. Similarly, servers 1740 and 1745 generally represent computing devices or systems, such as application servers or database servers, configured to provide various database services and/or run certain software applications. Network 1750 generally represents any telecommunication or computer network including, for example, an intranet, a WAN, a LAN, a PAN, or the Internet. In one example, client systems 1710, 1720, and/or 1730 and/or servers 1740 and/or 1745 may include all or a portion of system 100 from FIG. 1.

As illustrated in FIG. 17, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data and/or other computer-readable instructions. In certain embodiments, storage devices 1760(1)-(N) and storage devices 1770(1)-(N) may represent Network-Attached Storage (NAS) devices configured to communicate with servers 1740 and 1745 using various protocols, such as Network File System (NFS), Server Message Block (SMB), or Common Internet File System (CIFS).

Servers 1740 and 1745 may also be connected to a Storage Area Network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) and/or an intelligent storage array 1795. SAN fabric 1780 may also facilitate, via network 1750 and servers 1740 and 1745, communication between client systems 1710, 1720, and 1730 and storage devices 1790(1)-(N) and/or intelligent storage array 1795 in such a manner that devices 1790(1)-(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to exemplary computing system 1610 of FIG. 16, a communication interface, such as communication interface 1622 in FIG. 16, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although FIG. 17 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the exemplary embodiments disclosed herein may also be encoded as a computer program, stored in server 1740, run by server 1745, and distributed to client systems 1710, 1720, and 1730 over network 1750.

As detailed above, computing system 1610 and/or one or more components of network architecture 1700 may perform and/or be a means for performing, either alone or in combination with other elements, one or more steps of an exemplary method for detecting transactional message sequences that are obscured in multicast communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a sequence of messages to be transformed, transform the sequence of messages into a sequence graph, output a result of the transformation to a system that traverses sequence graphs to detect cyclic sequences of request-respond messages, use the result of the transformation to detect a cyclic sequence of request-respond messages, and store the result of the transformation to a storage system that stores information about cyclic sequences of request-respond messages. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting transactional message sequences that are obscured in multicast communications, at least a portion of the method being performed by a computing device comprising at least one processor, the method comprising:
    collecting a sequence of messages that were distributed on a communication channel, wherein:
        the sequence of messages comprises at least one obscured cyclic sequence of request-response messages that:
            were exchanged by at least two components; and
            are interleaved in the sequence of messages; and
        each message in the sequence of messages comprises an identifier that indicates a meaning of the message;
    constructing a sequence graph from the sequence of messages by:
        adding, for each unique message identifier in the sequence of messages, a node to the sequence graph to represent the unique message identifier; and
        adding, for each unique sequence transition in the sequence of messages from an immediately-preceding message to an immediately-succeeding message, an edge to the sequence graph to:
            represent the unique sequence transition; and
            connect the node that represents the identifier of the unique sequence transition's immediately-preceding message to the node that represents the identifier of the unique sequence transition's immediately-succeeding message;
    traversing the sequence graph to discover the obscured cyclic sequence of request-response messages; and
    performing a security action using a representation of the obscured cyclic sequence of request-response messages.

2. The computer-implemented method of claim 1, wherein the communication channel comprises an automobile network.

3. The computer-implemented method of claim 1, wherein collecting the sequence of messages comprises:
    logging the identifier of each message in the sequence of messages;
    logging an order in which each message in the sequence of messages was observed; and
    logging a time at which each message in the sequence of messages was observed.

4. The computer-implemented method of claim 1, wherein constructing the sequence graph further comprises:
    creating, for each node in the sequence graph, a dictionary of sequence transitions; and
    adding, for each sequence transition in the sequence of messages whose succeeding message's identifier is equal to the identifier that is represented by the node, an entry to the dictionary to represent the sequence transition, wherein:
        the entry comprises:
            a preceding-message identifier that is equal to the identifier of the sequence transition's preceding message;
            a transition order that is equal to the order of the sequence transition in the sequence of messages; and
            a time interval equal to the amount of time between observances of the sequence transition's preceding message and the sequence transition's succeeding message; and
        the edge that connects the nodes that represent the identifiers of the sequence transition's preceding and succeeding messages comprises a directed edge that is incident from the node that represents the identifier of the sequence transition's preceding message and incident to the node that represents the identifier of the sequence transition's succeeding message.

5. The computer-implemented method of claim 4, wherein traversing the sequence graph comprises:
    visiting a node in the sequence graph;
    identifying a potential cyclic sequence transition by identifying a group of entries in the node's dictionary whose preceding-message identifiers match; and
    determining that the potential cyclic sequence transition is likely a cyclic sequence transition in the obscured cyclic sequence of request-response messages by determining that a variation in the time intervals of the group's entries is less than a predetermined threshold.

6. The computer-implemented method of claim 5, wherein traversing the sequence graph further comprises promoting each entry in the node's dictionary along a directed edge incident from the node and incident to an adjacent node by:
    identifying the transition order of the entry;

locating an adjacent entry in the adjacent node's dictionary whose transition order is one more than the transition order of the entry; and
adding an additional entry to the adjacent node's dictionary that comprises:
a preceding-message identifier that is equal to the entry's preceding-message identifier;
a transition order that is equal to the transition order of the entry; and
a time interval that is equal to a sum of the time interval of the entry and the time interval of the adjacent entry.

7. The computer-implemented method of claim 6, wherein traversing the sequence graph further comprises:
determining that the identifier that is represented by the node is an identifier of a proceeding message of another cyclic sequence transition in the obscured cyclic sequence of request-response messages; and
removing, from the dictionary of each node in the sequence graph, all entries whose preceding-message identifier matches the identifier that is represented by the node.

8. The computer-implemented method of claim 6, wherein traversing the sequence graph further comprises adding an additional directed edge to the sequence graph that is incident from the node that represents the entry's previous-message identifier and incident to the adjacent node.

9. The computer-implemented method of claim 6, wherein traversing the sequence graph comprises:
removing, from the sequence graph, each directed edge that is incident with the node; and
removing the node from the sequence graph.

10. The computer-implemented method of claim 5, further comprising:
creating a state machine to represent the obscured cyclic sequence of request-response messages;
adding, to the state machine, a first state to represent the identifier of the potential cyclic sequence transition's preceding message;
adding, to the state machine, a second state to represent the identifier of the potential cyclic sequence transition's succeeding message; and
adding, to the state machine, a transition from the first state to the second state.

11. The computer-implemented method of claim 10, wherein performing the security action comprises:
monitoring an additional sequence of messages on the communication channel;
detecting an anomaly in the additional sequence of messages by determining that the additional sequence violates the transition from the first state to the second state; and
performing the security action in response to detecting the anomaly.

12. The computer-implemented method of claim 11, wherein:
detecting the anomaly comprises determining that the anomaly indicates that the potential cyclic sequence transition is not a cyclic sequence transition in the obscured cyclic sequence of request-response messages; and
performing the security action comprises updating the state machine.

13. The computer-implemented method of claim 11, wherein:
detecting the anomaly comprises determining that the anomaly indicates that a component has malfunctioned; and
the security action is performed to remediate the malfunctioning of the component.

14. The computer-implemented method of claim 11, wherein:
detecting the anomaly comprises determining that the anomaly indicates a malicious attack on the communication channel; and
the security action is performed to remediate the malicious attack.

15. The computer-implemented method of claim 10, wherein:
adding the transition from the first state to the second state comprises adding a guard condition to the transition that requires the transition to occur within a predetermined amount of time, wherein the predetermined amount of time is based at least in part on the time intervals of the group's entries; and
performing the security action comprises:
monitoring an additional sequence of messages on the communication channel;
detecting an anomaly in the additional sequence of messages by determining that the additional sequence violates the guard condition; and
performing the security action in response to detecting the anomaly.

16. A system for detecting transactional message sequences that are obscured in multicast communications, the system comprising:
a collecting module, stored in memory, that collects a sequence of messages that were distributed on a communication channel, wherein:
the sequence of messages comprises at least one obscured cyclic sequence of request-response messages that:
were exchanged by at least two components; and
are interleaved in the sequence of messages; and
each message in the sequence of messages comprises an identifier that indicates a meaning of the message;
a constructing module, stored in memory, that constructs a sequence graph from the sequence of messages by:
adding, for each unique message identifier in the sequence of messages, a node to the sequence graph to represent the unique message identifier; and
adding, for each unique sequence transition in the sequence of messages from an immediately-preceding message to an immediately-succeeding message, an edge to the sequence graph to:
represent the unique sequence transition; and
connect the node that represents the identifier of the unique sequence transition's immediately-preceding message to the node that represents the identifier of the unique sequence transition's immediately-succeeding message;
a traversing module, stored in memory, that traverses the sequence graph to discover the obscured cyclic sequence of request-response messages;
a security module, stored in memory, that performs a security action using a representation of the obscured cyclic sequence of request-response messages; and
at least one processor that executes the collecting module, the constructing module, the traversing module, and the security module.

17. The system of claim 16, wherein the communication channel comprises an automobile network.

18. The system of claim 16, wherein the collecting module collects the sequence of messages by:
- logging the identifier of each message in the sequence of messages;
- logging an order in which each message in the sequence of messages was observed; and
- logging a time at which each message in the sequence of messages was observed.

19. The system of claim 16, wherein the constructing module constructs the sequence graph by further:
- creating, for each node in the sequence graph, a dictionary of sequence transitions; and
- adding, for each sequence transition in the sequence of messages whose succeeding message's identifier is equal to the identifier that is represented by the node, an entry to the dictionary to represent the sequence transition, wherein:
  - the entry comprises:
    - a preceding-message identifier that is equal to the identifier of the sequence transition's preceding message;
    - a transition order that is equal to the order of the sequence transition in the sequence of messages; and
    - a time interval equal to the amount of time between observances of the sequence transition's preceding message and the sequence transition's succeeding message; and
  - the edge that connects the nodes that represent the identifiers of the sequence transition's preceding and succeeding messages comprises a directed edge that is incident from the node that represents the identifier of the sequence transition's preceding message and incident to the node that represents the identifier of the sequence transition's succeeding message.

20. A non-transitory computer-readable medium comprising one or more computer-executable instructions that, when executed by at least one processor of a computing device, cause the computing device to:
- collect a sequence of messages that were distributed on a communication channel, wherein:
  - the sequence of messages comprises at least one obscured cyclic sequence of request-response messages that:
    - were exchanged by at least two components; and
    - are interleaved in the sequence of messages; and
  - each message in the sequence of messages comprises an identifier that indicates a meaning of the message;
- construct a sequence graph from the sequence of messages by:
  - adding, for each unique message identifier in the sequence of messages, a node to the sequence graph to represent the unique message identifier; and
  - adding, for each unique sequence transition in the sequence of messages from an immediately-preceding message to an immediately-succeeding message, an edge to the sequence graph to:
    - represent the unique sequence transition; and
    - connect the node that represents the identifier of the unique sequence transition's immediately-preceding message to the node that represents the identifier of the unique sequence transition's immediately-succeeding message;
- traverse the sequence graph to discover the obscured cyclic sequence of request-response messages; and
- perform a security action using a representation of the obscured cyclic sequence of request-response messages.

* * * * *